US008202586B2

(12) United States Patent
Takahashi et al.

(10) Patent No.: US 8,202,586 B2

(45) Date of Patent: Jun. 19, 2012

(54) INK-JET RECORDING MATERIAL

(75) Inventors: Tomomi Takahashi, Tokyo (JP); Ryu Kitamura, Yokohama (JP); Takehiko Kishimoto, Konan (JP); Hideo Mitsui, Kawasaki (JP); Shigeru Suzuki, Tokyo (JP)

(73) Assignee: Oji Paper Co., Ltd., Tokyo (JP)

(*) Notice: Subject to any disclaimer, the term of this patent is extended or adjusted under 35 U.S.C. 154(b) by 876 days.

(21) Appl. No.: 11/815,000

(22) PCT Filed: Jan. 26, 2006

(86) PCT No.: PCT/JP2006/301222

§ 371 (c)(1),
(2), (4) Date: Nov. 25, 2008

(87) PCT Pub. No.: WO2006/080395

PCT Pub. Date: Aug. 3, 2006

(65) Prior Publication Data

US 2009/0136692 A1 May 28, 2009

(30) Foreign Application Priority Data

Jan. 28, 2005 (JP) ................................ P2005-020625
Apr. 22, 2005 (JP) ................................ P2005-124996
May 25, 2005 (JP) ................................ P2005-151790

(51) Int. Cl.
*B41M 5/50* (2006.01)
*B05D 5/00* (2006.01)
*C04B 14/00* (2006.01)

(52) U.S. Cl. ............... 428/32.25; 428/32.37; 428/32.39; 427/256; 106/400

(58) Field of Classification Search ............... 428/32.25, 428/32.37, 32.39; 427/256; 106/400
See application file for complete search history.

(56) References Cited

U.S. PATENT DOCUMENTS

| | | | | |
|---|---|---|---|---|
| 3,556,725 | A | 1/1971 | Chiola et al. | |
| 4,460,637 | A | 7/1984 | Miyamoto et al. | |
| 4,474,847 | A | 10/1984 | Schroder et al. | |
| 5,041,328 | A | 8/1991 | Akiya et al. | |
| 5,102,643 | A | 4/1992 | Kresge et al. | |
| 5,171,626 | A | 12/1992 | Nagamine et al. | |
| 5,707,598 | A | 1/1998 | Inagaki et al. | |
| 5,853,870 | A | 12/1998 | Uchimura et al. | |
| 6,096,157 | A | 8/2000 | Imabeppu et al. | |
| 6,548,149 | B1 | 4/2003 | Liu et al. | |
| 6,569,908 | B2 | 5/2003 | Noguchi et al. | |
| 6,632,487 | B1 | 10/2003 | Arai et al. | |
| 6,632,488 | B2 * | 10/2003 | Okumura et al. | 428/32.25 |
| 6,991,330 | B2 | 1/2006 | Maekawa | |
| 2004/0096598 | A1 | 5/2004 | Kasamatsu et al. | |

FOREIGN PATENT DOCUMENTS

| | | |
|---|---|---|
| EP | 1 033 259 | 9/2000 |
| EP | 1084859 | 3/2001 |
| EP | 1 120 281 | 8/2001 |
| EP | 1 193 077 | 4/2002 |
| EP | 1 236 582 | 9/2002 |
| EP | 1 452 328 | 9/2004 |
| EP | 1 580 016 | 9/2005 |
| JP | 06064918 | 3/1994 |
| JP | 8324102 | 12/1996 |
| JP | 2000313163 | 11/2000 |
| JP | EP 1 120 281 | * 1/2001 |
| JP | 2002274022 | 9/2002 |
| JP | 2003040916 | 2/2003 |
| JP | 2003211825 | 7/2003 |
| JP | 2004174810 | 6/2004 |
| JP | 2005280147 | 10/2005 |

OTHER PUBLICATIONS

Date stamped letter of Feb. 12, 2008 in connection with the Supplemental European Search Report in corresponding European Application No. 06712404.0.
European Search Report issued in corresponding European Patent Application No. EP 09 15 7652, dated Jun. 16, 2009.
Fine Powder Handbook, Aasakurashoten, p. 52, 1991.
Yoldas, Bulent E., "Alumina Sol Preparation from Alkoxides", *Amer. Ceram. Soc. Bull.*, vol. 54, No. 3, 1975, p. 289-290.
International Search Report from PCT/JP2006/301222 dated Apr. 18, 2006.

* cited by examiner

*Primary Examiner* — Gerard Higgins
*Assistant Examiner* — Sathavaram I Reddy
(74) *Attorney, Agent, or Firm* — Knobbe Martens Olson & Bear LLP

(57) ABSTRACT

The present invention provides an ink-jet recording material containing: a support; and at least two ink-receiving layers of an ink-receiving underlayer and an ink-receiving top layer, the ink-receiving layers containing a pigment and a binder and being disposed on the support; characterized in that the ink-receiving top layer contains: a finely agglomerated pigment with an average particle diameter of 0.008 to 0.7 μm, selected from the group consisting of a silica, an alumina, and an alumina hydrate; and a coarse-grained pigment with an average particle diameter of 1 to 30 μm, the coarse-grained pigment being contained in an amount of 1 to 15 parts by mass with respect to 100 parts by mass of the finely agglomerated pigment.

4 Claims, No Drawings

INK-JET RECORDING MATERIAL

RELATED APPLICATIONS

This application is the U.S. National Phase filing under 35 U.S.C. §371 of PCT/JP2006/301222, filed Jan. 26, 2006, which designated the United States and was published in a language other than English, which claims priority under 35 U.S.C. §119(a)-(d) to Japanese Patent Application No. 2005-020625, filed Jan. 28, 2005; Japanese Patent Application No. 2005-124996, filed Apr. 22, 2005; and Japanese Patent Application No.2005-151790, filed May 25, 2005. The content of these applications is incorporated herein by reference in their entireties.

TECHNICAL FIELD

The present invention relates to an ink-jet recording material having such a favorable ink-absorbing capability that high-speed recording can be realized, exhibiting a rapid color-stabilizing rate after printing, causing no cockling, having image-recording parts with excellent smoothness, realizing high image-density and extremely favorable image-uniformity, and being suitable for both dye ink and pigment ink. In particular, the present invention relates to an ink-jet recording material that realizes favorable scratch-resistance at a printed portion even if a pigment ink is used, the difference between blank portion gloss and printed portion gloss of the ink-jet recording material being small when printing is performed using the pigment ink, and the ink-jet recording material being suitable for photographic application or the like.

BACKGROUND ART

Ink jet recording systems in which water-based ink is ejected through a nozzle having fine pores to form an image on the surface of an ink-jet recording material are widely used in photography or printing, due to their low noise during recording, ease of forming full-color images, possibility of performing rapid recording, lower cost than other printing devices, and so forth.

In recent years, an image with a quality equivalent to that of silver-halide photography or that of process printing has been realized, because of enhanced detail and speedup of a printer. However, the quality of recorded images significantly varies depending on the recording materials used. The recording materials are significantly differentiated in accordance with the intended purpose thereof, such as, for example, photographic application, printing application, general office application, or the like.

In order to realize high-image quality and high-image preservability, improvements to ink have also been made, and an ink in which a hydrophobic coloring pigment with an excellent water resistance and excellent light resistance is dispersed (hereinafter, referred to as a "pigment ink") has been put to practical use in addition to a water-based dye ink containing a highly-hydrophilic coloring agent conventionally used mainly (hereinafter, referred to as a "dye ink"). Accordingly, a recording material that can produce a high-quality image using both dye ink and pigment ink has been in great demand. In particular, there has been a great demand for an ink-jet recording material that exhibits favorable scratch-resistance at a printed portion even if pigment ink is used, the difference between blank portion gloss and printed portion gloss of the ink-jet recording material being small when printing is performed using the pigment ink, the ink-jet recording material being suitable for a photographic application, printing application, or the like.

In order to realize image recording density, smoothness, and ink absorbing capability, various proposals have been made.

In order to realize ink absorbing capability, there is disclosed a case in which at least one layer is formed so that one peak of the hole distribution curve of the uppermost layer is positioned at a location of between 0.2 μm and 10 μm and at least two peaks of the hole distribution curve of all the ink-receiving layers are positioned at a location of between 0.2 μm and 10 μm and at a location of 0.05 μm or less, respectively (see, for example, Patent Document 1). Although the ink-absorbing rate is significantly enhanced, it is required that the ink-receiving layer mainly contain a pigment with a particle diameter of 1 μm or more so as to obtain such an ink-jet recording material. If a recording layer mainly contains the pigment with a particle diameter of 1 μm or more, not only gloss thereof but also image density are low, and round dots are not realized, and thereby image uniformity is extremely low.

In order to realize gloss, print density, ink absorbing capability, dot-roundness, an attempt has been made to use at least two kinds of fine pigment (each having a particle diameter of 1 μm or less) to form a recording layer (see, for example, Patent Documents 2 and 3). If the fine pigments with a particle diameter of 1 μm or less are used, sufficient print quality is realized with a dye ink. However, in the case where printing is performed with a pigment ink, scratch-resistance of the pigment ink is insufficiently realized, and the difference between blank portion gloss and printed portion gloss is significant, and therefore utilization for photographic application, particularly printing application in which printing is often performed with a pigment ink is difficult.

An attempt has been made to formulate a matting agent with a specific diameter of 1 to 10 μm and a colored pigment with a particle diameter of 1 μm or less are formulated with a fine pigment with a particle diameter of 500 nm or less on a water-resistant support for applying the resultant to perform proof-printing (see, for example, Patent Document 4). However, since one recording layer basically serves to receive ink, the separation rate of a solvent in ink is slow, the scratch-resistance of pigment ink is not sufficient, color tone is not stable, and print density is not sufficiently exhibited.

Patent Document 1: Japanese Patent Application, First Publication No. S 58-110287.
Patent Document 2: Japanese Laid-Open Patent Application, No. 2004-174810.
Patent Document 3: Japanese Laid-Open Patent Application, No. 2003-211825.
Patent Document 4: Japanese Laid-Open Patent Application, No. 2004-001449.

DISCLOSURE OF THE INVENTION

Problems to be Solved by the Invention

The present invention relates to an ink-jet recording material which solves the above-mentioned problems, the ink-jet recording material exhibiting such a favorable ink absorbing capability that rapid printing is realized, an excellent smoothness at image-recording parts, a high-image density, and excellent image-uniformity, and being suitable for both dye ink and pigment ink. In particular, the present invention provides an ink-jet recording material that realizes favorable scratch-resistance at a printed portion even if a pigment ink is used, the difference between blank portion gloss and printed portion gloss of the ink-jet recording material being small when printing is performed using the pigment ink, and the ink-jet recording material being available for printing application, photographic application, or the like.

Means for Solving the Problems

As a result of accumulated investigation carried out so as to solve the above-mentioned problems, the inventors of the present invention have found that the problems can be solved by adopting the following constitutions, and then completed the present invention.

(1) An ink-jet recording material containing: a support; and at least two ink-receiving layers of an ink-receiving underlayer and an ink-receiving top layer, the ink-receiving layers being disposed on the support and each containing a pigment and a binder; in which the ink-receiving top layer contains: a finely agglomerated pigment with an average particle diameter of 0.008 to 0.7 μm, selected from the group consisting of a silica, an alumina, and an alumina hydrate; and a coarse-grained pigment with an average particle diameter of 1 to 30 μm, the coarse-grained pigment being contained in an amount of 1 to 15 parts by mass with respect to 100 parts by mass of the finely agglomerated pigment.

(2) An ink-jet recording material as set forth in (1), in which the pigment contained in the ink-receiving underlayer is a wet process silica and the binder contained therein is a latex binder.

(3) An ink-jet recording material as set forth in (1) or (2), in which the finely agglomerated pigment contained in the ink-receiving top layer is a silica-cationic compound agglomerated fine particle prepared by mixing a fumed silica with a cationic compound to obtain a silica-cationic compound agglomerated particle, followed by pulverizing and dispersing the silica-cationic compound agglomerated particle to have a particle diameter within a range of 0.01 to 0.7 μm.

(4) An ink-jet recording material as set forth in any one of (1) to (3), in which the ink-receiving top layer is a layer formed by applying and drying a coating liquid containing: an aqueous dispersion of a mixture of the coarse-grained pigment and a cationic compound; and an aqueous dispersion of the finely agglomerated pigment.

(5) An ink-jet recording material as set forth in any one of (1) to (4), in which a surface of the ink-jet recording material has a whiteness degree of 80 to 90%, the whiteness degree being measured in accordance with JIS P8148, a sensory chromaticity index a* of −1 to 2, and a sensory chromaticity index b* of −2.5 to 1.5, the sensory chromaticity indexes being measured in accordance with JIS P8722.

(6) An ink-jet recording material as set forth in any one of (1) to (5), in which at least one layer selected from the group consisting of the ink-receiving underlayer, the ink-receiving top layer, an undercoat layer optionally formed between the support and the ink-receiving underlayer, and an intermediate layer optionally formed between the ink-receiving underlayer and the ink-receiving top layer contains a coloring agent selected from the group consisting of colored pigments and colored dyes.

(7) A method for producing a pigment dispersion that forms an ink-jet recording layer, characterized in that an aqueous dispersion prepared by mixing and dispersing a cationic compound A with a coarse-grained pigment having an average particle diameter of 1 to 30 μm is added to and dispersed in an aqueous dispersion of a cationic finely agglomerated pigment with an average particle diameter of 0.7 μm or less.

(8) A method for producing a pigment dispersion that forms an ink-jet recording layer as set forth in (7), in which the coarse-grained pigment is a wet process silica.

(9) A method for producing a pigment dispersion that forms an ink-jet recording layer as set forth in (7) or (8), in which the coarse-grained pigment is formulated in an amount of 1 to 15% by mass with respect to a total mass of pigments.

(10) A method for producing a pigment dispersion that forms an ink-jet recording layer as set forth in any one of (7) to (9), in which the aqueous dispersion of the cationic finely agglomerated pigment is an aqueous dispersion containing at least one selected from the group consisting of an agglomerated fine particle of a silica-cationic compound B, an agglomerated fine particle of an alumina, and an agglomerated fine particle of an alumina hydrate.

(11) A method for producing an ink-jet recording material, characterized in that a coating liquid that forms an ink-jet recording layer is prepared by adding a binder to the pigment dispersion that forms an ink-jet recording layer prepared by the method of any one of (7) to (10), followed by applying and drying the coating liquid on a support or a coating layer formed on the support to form the ink-jet recording layer.

(12) An ink-jet recording material containing: a support; and at least two ink-receiving layers of an ink-receiving underlayer and an ink-receiving top layer, the ink-receiving layers being disposed on the support and each containing a pigment and a binder, characterized in that: the ink-receiving underlayer contains at least a pigment A and a pigment B, the pigment A having a BET specific surface area of less than 100 $m^2/g$, the pigment B having a BET specific surface area of no less than 100 $m^2/g$, and a content ratio of the pigment A to the pigment B being within the range of 9/1 to 1/9; and the ink-receiving top layer contains a finely agglomerated pigment with an average particle diameter of 0.008 to 0.7 μm and a binder, the finely agglomerated pigment being selected from the group consisting of a silica, an alumina, and an alumina hydrate.

(13) An ink-jet recording material as set forth in (12), in which the pigment A has an oil absorption of 10 to 100 ml/100 g.

(14) An inkjet recording material as set forth in (12) or (13), characterized in that the pigment B is a wet process silica with an average particle diameter of 0.01 to 0.7 μm.

(15) An ink-jet recording material as set forth in any one of (12) to (14), characterized in that a main component of the binder in the ink-receiving underlayer is selected from emulsion latexes.

(16) An ink-jet recording material as set forth in any one of (12) to (15), characterized in that the ink-receiving top layer contains a coarse-grained pigment with an average particle diameter of 1 to 30 μm in an amount of 0.1 to 15% by mass with respect to a total mass of pigments contained in the ink-receiving top layer.

(17) An ink-jet recording material as set forth in any one of (12) to (16), characterized by being prepared by a casting method in which the ink-receiving top layer in a wet state or a cast-coating liquid applied on the ink-receiving top layer in a wet state is brought into press contact with a heated mirror drum and then dried to copy a mirror surface thereon.

(18) An ink-jet recording material as set forth in any one of (12) to (17), characterized in that a surface of the ink-jet recording material has a whiteness degree of 80 to 90%, the whiteness degree being measured in accordance with JIS P8148, a sensory chromaticity index a* of −1 to 2, and a sensory chromaticity index b* of −2.5 to 1.0, the sensory chromaticity indexes being measured in accordance with JIS P8722.

Effects of the Invention

According to the present invention, the ink-jet recording material containing at least two ink-receiving layers is excellent in the surface smoothness, ink-absorbing capability, recorded image quality realized with both a dye ink and pigment ink, scratch-resistance of pigment ink, and stability of color tone, and exhibits small difference between gloss degrees at a blank portion and at a portion printed with a pigment ink. Also, formulation of the colored pigment in the ink-receiving layer realizes whiteness degree and color tone equivalent to those of coated sheet for printing, and thus the ink-jet recording material is excellent as an ink-jet sheet alternative to proof-printing paper or general-printing paper.

BEST MODE FOR CARRYING OUT THE INVENTION

The first aspect of the present invention is an ink-jet recording material containing: a support; and at least two ink-receiving layers of an ink-receiving underlayer and an ink-receiving top layer, the ink-receiving layers being disposed on the support and each containing a pigment and a binder; in which the ink-receiving top layer contains: a finely agglomerated pigment with an average particle diameter of 0.008 to 0.7 μm, selected from the group consisting of a silica, an alumina, and an alumina hydrate; and a coarse-grained pigment with an average particle diameter of 1 to 30 μm, the coarse-grained pigment being contained in an amount of 1 to 15 parts by mass with respect to 100 parts by mass of the finely agglomerated pigment.

In the following, the first aspect of the present invention will be explained in detail.

(Support)

As a support in the present invention, any of air-permeable supports and air-impermeable supports may be suitably selected in accordance with the application or intended use. In order to improve ink absorbing capability, particularly to realize rapid separation of a pigment and solvent contained in pigment ink, to improve pigment-fixability, and to enhance print density, an air-permeable base material is preferably selected.

(Air-Permeable Support)

As an air-permeable support, a paper base material, such as, for example, wood-free paper, art paper, coated paper, cast-coated paper, craft paper, baryta paper impregnated paper, or metallized paper, or a nonwoven fabric may be suitably used.

The paper base material is mainly composed of wood pulp and, as needed, a filler.

Various types of chemical pulp, mechanical pulp, and recycled pulp may be suitably used as the wood pulp, and the beating degree thereof may be controlled using a beating machine so as to adjust paper strength, and papermaking suitability, or the like. Although the beating degree (freeness) is not particularly limited, the beating degree is generally within the range of approximately 250 to 550 mL (CSF: JIS P8121). It is preferable that the beating degree be high so as to improve smoothness. However, a low beating degree often favorably prevents the occurrence of roughness of the recording material and bleeding of the recorded image, the roughness and bleeding being caused by moisture in ink when recording is performed on a produced recording sheet. Accordingly, it is preferable that the freeness be approximately within the range of 300 to 500 ml.

The filler is formulated so as to provide opaqueness or adjust the ink absorbing capability, and examples thereof include calcium carbonate, baked kaolin, silica, titanium oxide, and the like. In particular, calcium carbonate increases the whiteness degree of the base material and provides an enhanced gloss to the ink-jet recording material, and thus is preferably used. It is preferable that the content ratio (ash content) of the filler in the paper base material be approximately within the range of 1 to 25% by mass. If the content ratio is extremely large, there is a possibility in which the paper strength decreases. If the content ration is extremely small, the air-permeability decreases. A more preferable content ratio of the filler is within the range of 7 to 20% by mass. If the content ratio is within the range, a favorable balance is exhibited among the smoothness, air-permeability, and paper strength, as a result of which an ink-jet recording material with an excellent smoothness is easily obtained.

In the paper base material, a sizing agent, a fixing agent, a paper-reinforcing agent, a cationizing agent, yield-improving agent, a dye, a fluorescent whitening agent, or the like, may be formulated as an auxiliary agent. Moreover, the surface strength, sizing degree, or the like, may be adjusted in a size press process of a paper making machine by applying or impregnating starches, polyvinyl alcohols, cationic resins, or the like. It is preferable that the Stoeckigt sizing degree (of 100 g/m$^2$ paper) be approximately 1 to 200 seconds. When the sizing degree is low, generation of wrinkles at the time of application or other problems may occur in operation. When the sizing degree is high, there are cases in which the ink absorbing capability deteriorates and curling or cockling occurs significantly after printing. The more preferable sizing degree is within the range of approximately 4 to 120 seconds. Although the basis weight of the paper base material is not particularly limited, the basis weight is generally within the range of approximately 20 ~400 g/m$^2$. In particular, the basis weight is preferably within the range of approximately 50 to 150 g/m$^2$, and even more preferably 60 to 120 g/m$^2$, for printing application.

(Air-Impermeable Support)

Examples of the air-impermeable support include films of polyethylene, polypropylene, soft polyvinyl chloride, hard polyvinyl chloride, polyester, or the like (include synthetic paper), resin-coated papers in which a thermoplastic resin such as polyolefin is laminated on the air-permeable support, and laminated sheets in which films or the like are laminated. Preferable examples of the support include resin-coated papers in which the paper base material is coated with polyolefin resins (preferably, polyethylene resins). Although a recording material containing an air-impermeable support exhibits a slow rate of separation of dye or pigment from solvent in ink, the solvent in ink does not penetrate in the base material, and therefore the recording material is effectively used to prevent cockling.

The resin-coated paper, particularly a support in which a polyethylene resin with a kneaded titanium oxide is applied on the surface of the paper base material, realizes a finished appearance approximately equivalent to that of photographic printing paper, and thus is preferably used, in particular. The thickness of the polyethylene resin layer is preferably within the range of 3 to 50 μm, and more preferably 5 to 30 μm. If the thickness of the polyethylene resin layer is less than 3 μm, there are cases in which holes or other defects are generated in the polyethylene resin layer, adjustment of the thickness is difficult, and realization of smoothness is also difficult. If the thickness exceeds 50 μm, realized effects are small with respect to increase of cost, which is wasteful.

As the paper base material of the resin-coated paper, ones exemplified in the above as the air-permeable support may be used.

In order to improve adhesiveness of the support to the ink-receiving layer, the support surface on which an ink-receiving layer is to be formed may be previously subjected to sticking treatment or adhering treatment. In particular, if the resin-coated paper is used as a support, it is preferable that corona discharge treatment be applied to the surface of the resin-coated paper, or an undercoat layer composed of gelatin, polyvinyl alcohols (hereinafter, referred to as "PVA") be provided on the surface of the resin-coated paper.

(Ink-Receiving Top Layer)

The ink-receiving top layer according to the present invention contains 1 to 15 parts by mass of a coarse-grained pigment with an average particle diameter of 1 to 30 μm with respect to 100 parts by mass of a finely agglomerated pigment with an average particle diameter of 0.008 to 0.7 μm, the finely agglomerated pigment being selected from the group consisting of silica, alumina, and alumina hydrate.

In the following, an object, constitution, and production method, of the ink-receiving top layer will be explained.

An object of forming the ink-receiving top layer is to rapidly fix dye or pigment in ink, and realize high color development (high print density) and a uniform image (round dot). By formulating as pigments the finely agglomerated pigment with an average particle diameter of 0.008 to 0.7 μm, selected from the group consisting of a silica, an alumina, and an alumina hydrate, and the coarse-grained pigment with an average particle diameter of 1 to 30 μm, the content ratio of the coarse-grained pigment with respect to 100 parts by mass of the finely agglomerated pigment being 1 to 15 parts by mass, high color development and uniform image are realized. In particular, favorable scratch-resistance is realized even at a portion subjected to printing with a pigment ink, and the difference between gloss degrees at a blank portion and at a portion printed with the pigment ink is decreased. The ink-receiving top layer allows utilization as an ink-jet sheet alternative to photography, proof-printing paper, or general-printing paper.

It is preferable that the ink-receiving top layer according to the present invention have no cracking thereon so as to realize high-image quality and suitability for pigment ink (including capability of realizing image-uniformity and scratch-resistance). That is, it is preferable that a pigment, a binder, and the like be contained in continuous films. As a method for preventing cracking, one in which the ink-receiving top layer is formed by increasing the viscosity of a coating liquid or cross-linking the coating liquid, while applying the coating liquid, or in the way of drying the applied coating liquid but before the applied coating liquid exhibits a decrease in drying rate, may be mentioned.

For example, a method in which a coating liquid containing a hydrophilic resin which forms a hydrogel by electron irradiation is applied to form a coating layer, and the viscosity of the coating layer is increased (hydrogel is formed) by electron irradiation immediately after applying the coating liquid, or in the way of drying the coating layer but before the coating layer exhibits a decrease in drying rate; a method in which a coating liquid containing PVA is applied, and the viscosity of the coating liquid is increased and the coating liquid is cross-linked using a compound having a cross-linkability with PVA immediately after applying the coating liquid, or in the way of drying the formed coating layer but before the coating layer exhibits a decrease in drying rate; or a method in which a coating liquid containing a temperature-sensitive polymer (which exhibits hydrophilicity in the temperature region no higher than a particular temperature (temperature-sensitive point), but exhibits hydrophobicity in the temperature region higher than the temperature-sensitive point, as disclosed in Japanese Laid-Open Patent Application No. 2003-40916) as a binder is applied, and then immediately the temperature of the applied coating liquid is lowered to increase the viscosity of the formed coating layer, may be preferably selected, however, the method is not limited to these methods.

(Pigment to be Formulated in Ink-Receiving Top Layer)

As the finely agglomerated pigment contained in the ink-receiving top layer, the finely agglomerated pigment having an average particle diameter of 0.008 to 0.7 μm and being selected from the group consisting of a silica, an alumina, and an alumina hydrate, at least one is selected from the group consisting of: dry process silicas; mesoporous silicas; secondary silica dispersions prepared by adding an alkali to a colloidally-dispersing silica seed liquid, followed by gradually adding a feed liquid containing at least one selected from the group consisting of active silicate aqueous solutions and alkoxysilanes to the seed liquid to make silica fine particles grow; aluminas; and alumina hydrates. Among them, dry process silicas or aluminas are preferably selected in view of film-formability of the ink-receiving layer or printed image density.

The dry process silica available in the present invention may also be referred to as a fumed silica, and may be generally prepared by a combustion hydrolysis method. Although there is a generally known method in which the fumed silica is prepared by burning silicon tetrachloride together with hydrogen and oxygen, silanes, such as, for example, methyltrichlorosilane or trichlorosilane, may be used alone instead of silicon tetrachloride, or in combination with silicon tetrachloride.

The mesoporous silica available in the present invention is a silica madreporite having an average pore diameter of 1.5 to 100 nm. Also, mesoporous silicas including an introduced aluminium, titanium, vanadium, boron, or manganese atom or the like, may be used. Although a method for synthesizing mesoporous silica is not particularly limited, methods disclosed in U.S. Pat. No. 3,556,725, Published Japanese translation No. H5-503499 of PCT International Publication, Japanese Unexamined Patent Application, First Publication No. H4-238810, or the like, may be mentioned.

The secondary silica dispersions prepared by adding an alkali to a colloidally-dispersing silica seed liquid, followed by gradually adding a feed liquid containing at least one selected from the group consisting of active silicate aqueous solutions and alkoxysilanes to the seed liquid to make silica fine particles grow may be prepared by a method disclosed in Japanese Laid-Open Patent Application No. 2001-354408, for example.

The alumina available in the present invention may also be generally referred to as an aluminium oxide having crystallinity. Examples thereof include aluminium oxides having a $\chi$, $\kappa$, $\gamma$, $\delta$, $\theta$, $\eta$, $\rho$, pseudo $\gamma$, or $\alpha$ crystal. In the present invention, the fumed aluminas and aluminium oxides having a $\gamma$, $\delta$, or $\theta$ crystal are preferable in view of luster texture, and ink absorbing capability. The gas-phase alumina (fumed alumina) is the most preferable because it exhibits a sharp particle size distribution and excellent film-formability, in particular. The gas-phase alumina is an alumina formed by hydrolyzing aluminum trichloride in a gas state at a high temperature, such a high temperature hydrolysis resulting in formation of alumina particles with high purity. The primary particle size of these particles is in a nano order, and exhibits an extremely narrow particle size distribution. Such a fumed alumina has a surface with cationic charge. The use of the fumed alumina in an ink jet coating has been disclosed in U.S. Pat. No. 5,171,626, for example.

Although the alumina hydrate available in the present invention is not particularly limited, boehmite or pseudoboehmite is preferably selected in view of ink absorbing capability and film-formability. As a method for preparing alumina hydrate, one in which aluminum isopropoxide is hydrolyzed with water (disclosed in B. E. Yoldas, Amer. Ceram. Soc. Bull., 54, 289 (1975) or the like), one in which aluminum alkoxide is hydrolyzed (disclosed in Japanese Unexamined Patent Application, First Publication No. H06-064918), or the like, may be adopted, for example.

It is preferable that the finely agglomerated pigment be formed by agglomeration of primary particles with an average primary particle diameter of 0.003 to 0.04° μm. It is more preferable that the pigment with an average particle diameter of 0.01 to 0.5 μm be formed by agglomeration of primary particles with an average primary particle diameter of 0.005 to 0.020 μm so that the dye or pigment contained in ink is easily fixed in the ink-receiving top layer and favorable ink-absorbing rate, image density, and gloss are realized. It is even more preferable that the pigment with an average particle diameter of 0.02 to 0.2 μm be formed by agglomeration of primary particles with an average primary particle diameter of 0.007 to 0.013 μm. The average particle diameter of 0.008 to 0.7 μm may be realized by applying a strong force using a mechanical apparatus in accordance with a so-called breaking down method (in which agglomerated raw materials are pulverized in fine parts). Examples of the mechanical apparatus include an ultrasonic homogenizer, pressure-type homogenizer, liquid-liquid collision type homogenizer, high speed roiling mill, roller mill, container driven medium mill, medium stirring mill, jet mill, mortar, disintegrator (apparatus that grinds and kneads an object in a bowl-shaped container using a pestle-shaped stirring bar), sand mill, and the like. In order to decrease the particle diameter, it is required that classification and repeated pulverization be performed.

Since a dye or pigment contained in ink generally exhibits anionic properties, it is preferable that a cationic compound be added, as needed, to the finely agglomerated pigment with an average particle diameter of 0.008 to 0.7 μm, selected from the group consisting of silica, alumina, alumina hydrate, so as to realize impovedly fixing of the dye or pigment. In particular, it is preferable that a cationic compound be added to silica, because silica exhibits anionic properties. An added method is not particularly limited. For example, in the case where neither agglomeration nor viscosity-increase occurs by adding a cationic compound to an aqueous dispersion of the finely agglomerated pigment, no problems arise by lightly dispersing the cationic compound to be uniformly dispersed. If the agglomeration or viscosity-increase occurs after adding the cationic compound, pulverization and dispersion performed in accordance with the above-mentioned breaking down method are effective. Of course, there is a method in which the finely agglomerated pigment is added to a solution of a cationic compound, followed by pulverizing and dispersing the resultant until the average particle diameter thereof is 0.008 to 0.7 μm.

In simultaneous pursuit of favorable ink absorbing capability and print density, it is preferable that the finely agglomerated pigment according to the present invention be a fumed silica. In particular, an agglomerated particle composed of the silica and cationic compound, the agglomerated particle being prepared by mixing the cationic compound with the fumed silica is preferably used. It is the most preferable to use a fumed silica-cationic compound agglomerated fine particle that is pulverized and dispersed to an average particle diameter of within a range of 0.01 to 0.5 μm.

(Cationic Compound)

As the cationic compound available in the present invention, the following are exemplified:

1) polyalkylene polyamines such as polyethylene polyamine and polypropylene polyamine, and derivatives thereof;
2) acrylic resins having a secondary amine group, tertiary amine group, and/or quaternary ammonium group;
3) polyvinylamines, polyvinylamidines, and five-membered amidines;
4) dicyan-based cationic resins such as dicyandiamide-formalin polycondensation products;
5) polyamine-based cationic resins such as dicyandiamide-diethylenetriamine polycondensation products;
6) epichlorohydrin-dimethylamine addition polymers;
7) dimethyldiallyl ammonium chloride-$SO_2$ polymers,
8) diallylamine-$SO_2$ polymers;
9) dimethyldiallyl ammonium chloride polymers;
10) polymers of allylamine salts;
11) dialkylaminoethyl (meth)acrylate quaternary ammonium salt polymers;
12) acrylamide-diallylamine salt copolymers; and
13) polyaluminium salts such as polyaluminium chloride, polyaluminium acetate, and polyaluminium lactate.

Among these, 3) the five-membered amidines and 13) the aluminium salts such as polyaluminium chloride, polyaluminium acetate, and polyaluminium lactate are preferably used.

Among them, the cationic polymers are preferable in view of dispersing capability, and the cationic resins having a primary, secondary, or tertiary amine group are particularly preferable due to the favorable dispersibility and print-preservability thereof. The amidine compound in which a five-membered ring is formed is the most preferable.

Although the molecular weight of the cationic polymer is not particularly limited, it is preferable that the molecular weight be within the range of 10,000 to 100,000 in view of dispersibility and dispersion stability. It is more preferable that the molecular weight be within the range of 20,000 to 70,000. If the molecular weight is extremely small, there is a case in which dispersibility is unfavorable. If the molecular weight is extremely large, there is a case in which dispersion stability deteriorates.

It is preferable that the formulation content of the cationic compound be 1 to 30 parts by mass, and more preferably 2 to 15 parts by mass, with respect to 100 parts by mass of the pigment (solid content).

As the coarse-grained pigment with an average particle diameter of 1 to 30 μm, various pigments known in the art of general coated paper, such as, for example, filmed silica, wet process silica, mesoporous silica, alumina, alumina hydrate, aluminosilicate, kaolin, clay, sintered clay, zinc oxide, tin oxide, magnesium sulfate, aluminum hydroxide, calcium carbonate, satin white, aluminum silicate, smectite, zeolite, magnesium silicate, magnesium carbonate, magnesium oxide, diatomaceous earth, styrene-based plastic pigment, or urea resin-based plastic pigment, may be used. In order to increase the ink absorbing capability or the scratch-resistance of the pigment and also to decrease the difference between gloss degrees at a blank portion and at a portion printed with the pigment ink, the wet process silica and alumina are preferably selected, and the wet process silica is more preferably selected.

Although no problems arise if the average particle diameter of the coarse-grained pigment is within the range of 1 to 30

μm, it is preferable that the average particle diameter be within the range of 1.5 to 15 μm, and more preferably 2 to 5 μm, so as to decrease the difference between gloss degrees at a blank portion and at a portion printed with the pigment ink while maintaining the smoothness of a portion printed with pigment ink.

The formulation amount of the coarse-grained pigment is 1 to 15 parts by mass, preferably 1.5 to 10 parts by mass, and even more preferably 2.5 to 6 parts by mass, with respect to 100 parts by mass of the finely agglomerated pigment. If the formulation amount of the coarse-grained pigment with respect to 100 parts by mass of the finely agglomerated pigment is less than 1 part by mass, the scratch-resistance of the pigment is insufficient, and the difference between gloss degrees at a blank portion and at a portion printed with the pigment ink is distinguished, in particular. If the formulation amount of the coarse-grained pigment with respect to 100 parts by mass of the finely agglomerated pigment exceeds 15 parts by mass, the scratch-resistance of the pigment is not further improved and image quality deteriorates.

If the coarse-grained pigment is previously dispersed in a cationic compound, and then added to the finely agglomerated pigment, neither agglomeration nor viscosity-increase occurs, and a uniform dispersion is obtained. An ink-receiving top layer formed by applying a coating liquid containing such a dispersion contains uniformly distributed coarse-grained pigment, and realizes an excellent image-uniformity, particularly, uniformity at an image portion printed with pigment ink.

(Binder to be Formulated in Ink-Receiving Top Layer)

As a binder contained in the ink-receiving top layer, conventionally well-known ones may be used. Examples thereof include PVA, polyvinyl pyrrolidone, casein, soybean proteins, synthetic proteins, starches, cellulose derivatives, such as, for example, carboxymethyl cellulose, and methyl cellulose, polymer latexes (emulsion-type, solvent-type, solvent-free-type), aqueous dispersion adhesives such as, for example, synthetic resin emulsions, temperature-sensitive polymers, and the like. It is preferable that PVA be contained as the main component in view of adhesiveness to the pigment. Also, in view of ink absorbing capability and cracking-preventability, a PVA with a polymerization degree of 2,000 or more is preferable, and a PVA with a polymerization degree of 3,500 or more and a saponification degree of 95% or more is even more preferable. A PVA with a polymerization degree of 4,000 or more and a saponification degree of 97% or more is the most preferable. In order to improve ink absorbing capability or the like, at least two kinds of binder may be used in combination.

A method in which a coating film is gelatinized by adding a compound having a cross-linkability with PVA is effective for the purpose of improving film-formability (cracking-preventability). The content of the compound having a cross-linkability with PVA is generally 0.001 to 10 parts by mass, preferably 0.01 to 5 parts by mass, and more preferably 0.05 to 1 parts by mass, with respect to 100 parts by mass of PVA. If the content is extremely small, the cross-linking effects are hardly exhibited. If the content is extremely large, there is a possibility in which the formed coating film is so hard that the ink-receiving layer is easily bent and cracked.

It is preferable that the compound having a cross-linkability with PVA be suitably formulated. A method for adding the compound having a cross-linkability is not particularly limited, and examples thereof include a method in which the compound is directly added to a coating liquid of the ink-receiving top layer; a method in which the compound is formulated in an ink-receiving layer adjacent to the ink-receiving top layer, or is applied on the ink-receiving layer, followed by applying a coating liquid of the ink-receiving top layer thereon; and a method in which a coaing liquid of the ink-receiving top layer is applied, followed by applying or absorbing a solution of the compound having a cross-linkability before the ink-receiving top layer exhibits a decrease in drying rate.

Examples of the compound having a cross-linkability with PVA include aldehyde-based cross-linking agents such as glyoxal, epoxy-based cross-linking agents such as ethyleneglycoldiglycidyl ether, vinyl-based cross-linking agents such as bisvinylsulfonylmethyl ether, aluminium alum, and boron-containing compounds such as boric acid and borax. Among them, the boron-containing compounds, which exhibit excellent film-hardening effects, are preferable, among which borax is particularly preferable.

(Ratio of Pigment to Binder (PB Ratio))

If the PB ratio in the ink-receiving top layer is within the range of 3 to 10, no problems arise. In view of balance between the ink absorbing capability and the coating film strength, the PB ratio is preferably within the range of 4 to 8, and more preferably 4 to 7. If the PB ratio is less than 3, there is a possibility in which the ink-absorbing rate is not controlled, and beading occurs. If the PB ratio exceeds 10, the coating film strength may be significantly decreased and serve no practical use.

Although the coating amount of the ink-receiving top layer is not particularly limited, the coating amount is generally adjusted to approximately 2 to 40 g/m$^2$, and preferably 3 to 15 g/m$^2$. If the coating amount is extremely small, the capability of fixing dye or pigment, which are contained in ink as color materials, may be insufficiently exhibited. If the coating amount is extremely large, no further improved effects are realized.

In the ink-receiving top layer, various auxiliary agents used in the art of manufacturing a general coated sheet, such as, for example, dispersants, thickeners, antifoamers, coloring agents, antistatic agents, or antiseptic agents, may be suitably formulated.

(Ink-Receiving Underlayer)

The ink-jet recording material according to the present invention has at least two ink-receiving layers of the ink-receiving top layer and the ink-receiving underlayer. At least one intermediate layer may be provided between the ink-receiving top layer and the ink-receiving underlayer. The ink-receiving underlayer contains a pigment and a binder. Since the ink-receiving underlayer enables the separation of a solvent from a dye or pigment rapidly, the presence of an ink-receiving underlayer realizes favorable color stability (so-called, $\Delta E=(\Delta L^2+\Delta a^2+\Delta b^2)^{1/2}$) or print density of a pigment ink.

(Pigment to be Formulated in Ink-Receiving Underlayer)

As the pigment used in the ink-receiving underlayer, various pigments used in the art of a general coated sheet, such as, for example, fumed silica, wet process silica, colloidal silica, mesoporous silica, alumina, alumina hydrate, aluminosilicate, kaolin, clay, sintered clay, zinc oxide, tin oxide, magnesium sulfate, aluminum hydroxide, calcium carbonate, satin white, aluminum silicate, smectite, zeolite, magnesium silicate, magnesium carbonate, magnesium oxide, diatomaceous earth, styrene-based plastic pigment, or urea resin-based plastic pigment, may be used.

In particular, a generally commercially available wet process silica, colloidal silica, kaolin, alumina, clay, sintered clay, or calcium carbonate is preferable in view of the smoothness of the recording material and the separation rate of an ink-solvent. It is more preferable that wet process silica agglomerated particles with an average secondary particle diameter of 1 μm or less, the colloidal silica, or the kaolin be contained. At least two kinds thereof may be effectively formulated in combination, as needed.

(Binder to be Formulated in Ink-Receiving Underlayer)

As the binder to be contained in the ink-receiving underlayer, conventionally well-known ones may be used. Examples thereof include PVAs, polyvinyl pyrrolidones, caseins, soybean proteins, synthetic proteins, starches, cellulose derivatives, such as, for example, carboxymethyl cellulose, and methyl cellulose, polymer latexes (emulsion-type, solvent-type, solvent-free-type), aqueous dispersion adhesives such as, for example, synthetic resin emulsions, temperature-sensitive polymers, and the like. In particular, it is preferable that the binder in the ink-receiving underlayer be the polymer latex in view of coating film strength, which is decreased by influences of a cross-linking agent contained in the ink-receiving top layer. Among them, the emulsion-type latex is preferably contained as the main component in view of the dispersion stability of a coating liquid. An acrylic emulsion latex, urethane emulsion latex, or SBR latex is more preferably contained in view of coating film strength and stability of the coating liquid. It is even more preferable that the wet process silica pigment and the latex binder be contained in view of balance among the surface smoothness, solvent separation rate, and coating film strength.

If the PB ratio of the ink-receiving underlayer is within the range of 1 to 8, no problems arise. The PB ratio is preferably within the range of 2 to 7, and more preferably within the range of 2.5 to 6.5, in view of balance between the capability of absorbing solvent and coating film strength.

If the PB ratio is less than 1, the solvent absorbing rate may be slow. If the PB ratio exceeds 8, the coating film strength may significantly decrease.

Although the coating amount of the ink-receiving underlayer is not particularly limited, the coating amount is generally adjusted to approximately 2 to 30 $g/m^2$, and preferably 5 to 20 $g/m^2$. If the coating amount is extremely small, the capability of separating solvent may deteriorate. If the coating amount is extremely large, no further improved effects are realized.

In the ink-receiving underlayer, various auxiliary agents used in the art of manufacturing a general coated sheet, such as, for example, dispersants, thickeners, antifoamers, coloring agents, antistatic agents, or antiseptic agents, may be suitably formulated. Also, a cationic compound may be formulated so as to fix a dye, because a slight amount of dye is fixed accompanying solvent-absorption.

The ink-jet recording material according to the present invention is preferably used as an ink-jet sheet alternative to a proof-printing or printing sheet. It is preferable that the white hue of the recording material surface be adjusted so that the whiteness degree measured in accordance with JIS P8148 is 80 to 90% and the sensory chromaticity index a* is −1 to 2, and the sensory chromaticity index b* is −2.5 to 1.5, in order to make an ink-jet sheet alternative to a proof-printing or printing sheet. The more preferable region of the whiteness degree is 83 to 88%, that of the sensory chromaticity index a* is 0 to 1.5, and that of the sensory chromaticity index b* is −2.5 to −1. In order to realize the above-mentioned white hue, a coloring agent selected from the group consisting of colored pigments and colored dyes is formulated in at least one ink-receiving layer. As the coloring agent, at least three colored pigments selected from the group consisting of blue-based ones, violet-based ones, red-based ones, and yellow-based ones are preferably used in combination, the colored pigments exhibiting at least three different colors.

Although examples of the colored pigment include water-soluble azo pigments, water-insoluble azo pigments, condensed azo pigments, phthalocyanine pigments, titanium black, titanium yellow, ultramarine blue, cobalt blue, carbon black, iron black, zinc oxide, cobalt oxide, aluminum hydroxide, and the like, the colored pigment is not limited to these. Also, a white pigment may be used so as to adjust the color tone by enhancing the whiteness degree. For example, inorganic pigments, such as, a clay, sintered clay, calcium carbonate, magnesium carbonate, titanium dioxide, zeolite, kaolin, baked kaolin, barium sulfate, magnesium silicate, or the like, organic pigments, such as polystyrene resins, polycarbonate resins, or the like, or other known ones may be used.

Although the hue is often adjusted using only two kinds of pigments, the hue approximate to that of a printing sheet is easily realized by selecting at least three kinds of colored pigments selected from blue-based ones, violet-based ones, red-based ones, and yellow-based ones.

It is preferable that the colored pigment that controls the hue be formulated in a layer other than the ink-receiving top layer. Since the ink-receiving top layer according to the present invention exhibits transparency, it is preferable that the colored pigment that controls the hue be formulated in a layer other than the ink-receiving top layer from the standpoint of preservability. If the colored pigment is formulated in the ink-receiving top layer as disclosed in Japanese Laid-Open Patent Application No. 2004-001449, the preservability may deteriorate. Moreover, since the ink-receiving top layer contains the fine pigment, the transparency thereof is high, and therefore, color unevenness of a blank sheet may be easily caused even by only slight unevenness of the coating amount. If the colored pigment is formulated in the ink-receiving top layer, there is a possibility in which not only is the transparency suppressed, but also the dispersibility of a coating liquid deteriorates. In order to adjust the white hue without deterioration of preservability or occurrence of unevenness, it is preferable that the colored pigment be formulated in an ink-receiving layer adjacent to the ink-receiving top layer.

The colored pigment is preferably added to a coating composition as a dispersing element. In view of color-developability and preservability, the particle diameter of the colored pigment as the dispersing element is preferably 10 μm or less, more preferably 2 μm or less, and even more preferably 0.04 to 0.5 μm. When the colored pigment is dispersed, a propylene glycol is preferably formulated in view of balance among the dispersibility, environmental properties, and safety.

A rear layer may be provided so as to improve preventability of curling and conveyability.

In order to further increase gloss, a method in which the ink-receiving top layer in a wet state is brought into press contact with a heated mirror drum and then dried, a so-called casting method, may be effectively used.

(Coating Apparatus and Coating Method)

As a coating apparatus used for forming the ink-receiving top layer or other ink-receiving layers, various well-known coating apparatuses, such as, for example, a blade coater, air knife coater, roll coater, bar coater, gravure coater, rod blade coater, lip coater, curtain coater, and die coater, are exemplified. If at least two layers are coated, it is preferable that coating be performed in accordance with a wet-on-wet coating method in which the upper layer is coated on the lower layer while the lower layer is not dried.

(Calendar Treatment)

The surface of the ink-jet recording material can be improved in terms of roughness, and luster texture and smoothness texture of appearance, by subjecting at least one layer of the ink-receiving layers to smoothing treatment using a calendar. It is preferable that the calendaring pressure be 30 to 250 kg/cm, and more preferably 50 to 180 kg/cm. If the calendaring pressure is less than 30 kg/cm, the smoothing effects may not be realized. If the calendaring pressure exceeds 250 kg/cm, the ink-receiving layer tends to be extremely crushed and the ink absorbing capability tends to deteriorate.

(Average Particle Diameter)

In the present specification, the phrase "particle diameter" refers to a number average particle diameter. In the case where primary particles are monodispersed, the phrase "particle diameter" refers to an average primary particle diameter. In the case where primary particles are agglomerated to form secondary particles, the phrase "particle diameter" refers to an average secondary particle diameter. The average particle diameter (average primary particle diameter or average secondary particle diameter) is determined by stirring and dispersing a 5% dispersion liquid for 30 minutes using a homonmixer at 2,000 rpm, and then immediately applying the dispersion liquid to prepare a sample, followed by observing the dispersion liquid using electron microscopes (SEM and TEM), taking electron micrographs at 10,000 to 400,000-fold magnification, measuring the Martin's diameter of the secondary particles within a 5-cm square, and then averaging obtained values (see "Fine particle handbook", Asakura Shoten, page 52, 1991).

Next, the ink-jet recording material of the second aspect according to the present invention will be circumstantially explained only in terms of different points from the above-mentioned first aspect, and explanation with respect to the same points as the first aspects will be omitted.

The ink-jet recording material of this aspect contains at least two ink-receiving layers of an ink-receiving underlayer and an ink-receiving top layer, formed on an air-impermeable support or an air-low-permeable support, the ink-receiving layers each contains a pigment and a binder, and is characterized in that: the ink-receiving underlayer is adjacent to the ink-receiving top layer; the ink-receiving top layer contains a finely agglomerated pigment with an average particle diameter of 0.008 to 0.7 μm, selected from the group consisting of a silica, an alumina, and an alumina hydrate, and a coarse-grained pigment with an average particle diameter of 1 to 30 μm, 1 to 15 parts by mass of the coarse-grained pigment being contained with respect to 100 parts by mass of the finely agglomerated pigment; and the ink-receiving underlayer contains a wet process silica with an average particle diameter of 0.05 to 1 μm.

"Support"

As the support, an air-impermeable support or air-low-permeable support may be used. By using the air-impermeable support or the air-low-permeable support, penetration of a solvent contained in ink can be prevented, and thereby, occurrence of cockling can be prevented. As a result, a favorable appearance of printed matter can be realized, and defacement or breakage of the recording sheet, or failure of a recording head, which are caused by contact of the cockled recording material with the recording head, can be prevented.

The term "air-low-permeable support" or "air-impermeable support" means a support with an air-permeability of 500 seconds or more, and more preferably 1,000 seconds or more. The air-permeable property is represented by the air-permeability which is generally known as an evaluation item with respect to the porosity of paper or nonwoven fabric. The air-permeability is represented by the time period taken for 100 ml of air to pass through a test piece with an area of 645 $mm^2$, and is defined in JIS P 8117 (method for testing air-permeability of paper and paperboard).

As the air-low-permeable support or air-impermeable support, those exemplified in the first aspect may be exemplified. In view of texture or price, the synthetic paper and resin-coated paper are preferable, among which the resin-coated paper containing incorporated titanium oxide, so-called RC paper, is preferably used.

"Ink-Receiving Top Layer"

The present aspect of the ink-jet recording material contains at least two coating layers on the support. The ink-receiving top layer provided at a position farthest from the support is a layer containing the finely agglomerated pigment with an average particle diameter of 0.008 to 0.7 μm, selected from the group consisting of a silica, an alumina, and an alumina hydrate, and the coarse-grained pigment with an average particle diameter of 1 to 30 μm, 1 to 15 parts by mass of the coarse-grained pigment being contained with respect to 100 parts by mass of the finely agglomerated pigment.

(Finely Agglomerated Pigment)

The finely agglomerated pigment is at least one finely agglomerated pigment selected from silica, alumina, and alumina hydrate, with an average particle diameter of 0.008 to 0.7 μm. Although silica available in the present aspect is not particularly limited, a fumed silica is the most preferable.

Since the dye or pigment contained in ink-jet ink generally exhibits anionic properties, the silica is preferably treated to exhibit cationic properties by a well-known manner as adopted in the first aspect. In particular, silica-cationic compound agglomerated fine particles prepared by mixing the silica with a cationic compound to form silica-cationic compound agglomerated particles and then pulverizing and dispersing the silica-cationic compound agglomerated particles to a particle size within the range of 0.01 to 0.7 μm are preferable.

As the cationic compound, the same ones as those exemplified in the first aspect may also be exemplified.

Although the formulation amount of the cationic compound with respect to 100 parts by mass of the silica in the silica-cationic compound agglomerated fine particles is not particularly limited, the formulation amount is preferably within the range of 1 to 30 parts by mass, and more preferably 5 to 15 parts by mass. If the formulation amount of the cationic compound is less than 1 part by mass, the dispersion stability tends to deteriorate. On the other hand, if the formulation amount of the cationic compound exceeds 30 parts by mass, no further improved effects tend to be realized.

As the alumina and alumina hydrate, the same ones as those exemplified in the first aspect may also be exemplified, and are preferably selected.

Although the alumina and the alumina hydrate exhibits cationic properties, a cationic compound may further be formulated so as to further fix dye or pigment contained in ink. As the cationic compound which may be formulated, the same ones as those described above may be suitably used alone or in combination.

It is preferable that the finely agglomerated pigment be formed by agglomeration of primary particles with an average primary particle diameter of 0.003 to 0.04 μm. In order to easily fix a dye or pigment of ink-jet ink in the ink-receiving top layer and to realize a favorable ink-absorbing rate and image density, a pigment with an average particle diameter of 0.01 to 0.3 μm, formed by agglomeration of primary particles with an average primary particle diameter of 0.005 to 0.020 μm, is preferable. A pigment with an average particle diameter of 0.02 to 0.2 μm, formed by agglomeration of primary particles with an average primary particle diameter of 0.007 to 0.013 μm is more preferable.

(Coarse-Grained Pigment)

As the coarse-grained pigment with an average particle diameter of 1 to 30 μm, the same coarse-grained pigments as those used in the above-mentioned first aspect may be used. In order to realize ink absorbing capability or scratch-resistance of the pigment, or decrease the difference between gloss degrees at a blank portion and at a portion printed with the pigment ink, the wet process silica and alumina are preferably selected. The wet process silica is the most preferable.

It is preferable that the average particle diameter of the coarse-grained pigment be within the range of 1.5 to 15 μm, and more preferably 2 to 5 μm, for the same reasons as those of the first aspect.

In order to prevent agglomeration or viscosity-increase at the time of adding the coarse-grained pigment to a slurry containing the finely agglomerated pigment, it is preferable that the coarse-grained pigment be previously dispersed in a cationic compound. The cationic compound is suitably selected from the above-mentioned cationic compounds.

The coarse-grained pigment is generally formulated in an amount of 1 to 15 parts by mass, preferably 1 to 10 parts by mass, and even more preferably 2 to 6 parts by mass, with respect to 100 parts by mass of the finely agglomerated pigment. If the formulation amount of the coarse-grained pigment with respect to 100 parts by mass of the finely agglomerated pigment is less than 1 part by mass, the scratch-resistance of the pigment may be insufficiently realized, and difference between gloss degrees at a blank portion and a portion printed with a pigment-ink may be distinguished, in particular. If the formulation amount of the coarse-grained pigment with respect to 100 parts by mass of the finely agglomerated pigment exceeds 15 parts by mass, the scratch-resistance of the pigment may not be further improved, and the image-quality may deteriorate.

(Binder)

The ink-receiving top layer contains a binder in addition to the above-mentioned finely agglomerated pigment and coarse-grained pigment.

As the binder, the same ones as those exemplified as the binder to be formulated in the ink-receiving top layer of the first aspect are preferably used.

The ink-receiving top layer is formed by applying a coating liquid containing the above-mentioned finely agglomerated pigment, coarse-grained pigment, and binder on the ink-receiving underlayer. In the coating liquid, various auxiliary agents used in the art of manufacturing a general coated sheet, such as, for example, dispersants, thickeners, antifoamers, coloring agents, antistatic agents, antiseptic agents, or the like, may be suitably formulated.

"Ink-Receiving Underlayer"

(Wet Process Silica)

The ink-receiving underlayer is a layer adjacent to the ink-receiving top layer, formed at a side nearer to the support than the ink-receiving top layer, and containing a wet process silica with an average particle diameter of 0.05 to 1 μm. If the average particle diameter is less than 0.05 μm, ink-absorbing rate may decrease. If the average particle diameter exceeds 1 μm, the surface smoothness of the ink-jet recording material may deteriorate. As the wet process silica, precipitated silicas, gel-type silicas, water glass silicas may be exemplified. In order to improve the color-developability or hasten the color-stabilizing rate after printing, gel-type silica is preferably selected.

As the wet process silica with an average particle diameter of 0.05 to 1 μm, generally commercially available ones may be used. Alternatively, ones obtained by treating a silica powdery pigment using a mechanical apparatus in accordance with the breaking down method (the method in which agglomerated raw materials are pulverized to fine parts) as described above may be used. In order to decrease the particle diameter, classification and repeated pulverization are required. In order to improve the water-resistance after printing, a cationic compound may be formulated.

Various other pigments conventionally known and used in the art of manufacturing a general coated sheet may be formulated, unless the quality deteriorates (in order to improve ink absorbing capability or adjust color tone, for example).

(Binder)

The ink-receiving underlayer contains the same binder as that formulated in the ink-receiving top layer. As the binder, the same ones as those of the above-mentioned ink-receiving top layer are preferably used.

The ink-receiving underlayer is formed by applying a coating liquid containing the above-mentioned wet process silica and binder on the support (or on an optional layer formed on the support). In the coating liquid, various auxiliary agents used in the art of manufacturing a general coated sheet, such as, for example, dispersants, thickeners, antifoamers, coloring agents, antistatic agents, or antiseptic agents, may be suitably formulated.

"Ink-Receiving Top Layer and Ink-Receiving Underlayer"

It is preferable that the PB ratio of the ink-receiving top layer and the ink-receiving underlayer be within the range of 3 to 10 (the content ratio of binder be within the range of 25 to 9.1%), more preferably within the range of 3.5 to 8 (the content ratio of binder be within the range of 22.2 to 11.1%), and even more preferably 4 to 7 (the content ratio of binder be within the range of 20 to 12.5%) in view of the balance between the ink absorbing capability and the coating film strength. If the PB ratio is less than 3, there is a possibility in which the ink-absorbing rate cannot be controlled and beading occurs. If the PB ratio exceeds 10, there is a possibility in which the coating film strength significantly decreases. Moreover, it is preferable that the content ratio of binder in the ink-receiving top layer of this aspect be smaller than that in the ink-receiving underlayer, in view of ink absorbing capability or color-stabilizing rate after printing. It is preferable that the value calculated by dividing the content ratio of binder in the ink-receiving top layer by the content ratio of binder in the ink-receiving underlayer be 0.5 or more and less than 1, and more preferably within the range of 0.7 to 0.9.

Although each coating amount of the ink-receiving top layer and ink-receiving underlayer is not particularly limited, the coating amount is generally approximately 2 to 40 $g/m^2$, preferably 3 to 30 $g/m^2$. It is preferable that the coating amount of the ink-receiving underlayer be larger than that of the ink-receiving top layer, in view of color-developability.

If PVA is used as a binder, a method in which a compound having a cross-linkability with PVA is formulated to gelatinize a coating film is effective to improve film-formability (preventability of cracking). The formulation amount of the compound having a cross-linkability with PVA with respect to 100 parts by mass of PVA is preferably approximately the same amount as that of the above-mentioned first aspect.

As the compound having a cross-linkability with PVA and a method for formulation thereof, the same ones as those exemplified in the first aspect may be exemplified.

In order to increase the color-stabilizing rate after printing, it is preferable that the ink-receiving top layer exhibit cationic properties and the ink-receiving underlayer exhibit anionic properties. It is more preferable that the content ratio of cation in the surface portion of the ink-receiving top layer be larger than the average content ratio of cation in the ink-receiving top layer "Other Coating Layers"

In this aspect, an undercoat layer may be formed between the ink-receiving underlayer and the support so as to further improve absorbing capability or adherence to the support. The undercoat layer may be either a single layer or a multi-layer.

As a pigment to be formulated in the undercoat layer, various pigments known in the art of a general coated sheet, such as ones exemplified as the pigment to be formulated in the ink-receiving underlayer of the first aspect, may be used alone or in combination of at least two kinds thereof.

As the binder, water-soluble resin binders, such as PVA, and water-insoluble synthetic resin latexes are exemplified.

Although the coating amount of the undercoat layer is not particularly limited, the coating amount is generally approximately 1 to 30 g/m$^2$, and preferably 2 to 15 g/m$^2$.

In the undercoat layer, various auxiliary agents used in the art of manufacturing a general coated sheet, such as, for example, dispersants, thickeners, antifoamers, coloring agents, antistatic agents, or antiseptic agents, may be suitably formulated. Also, a cationic compound may be formulated to fix dye, because a slight amount of dye is fixed accompanying solvent-absorption.

"Common Elements to Each Layer"

(Coating Apparatus)

As the coating apparatus used to apply a coating liquid that forms each layer, ones exemplified in the first aspect may be used.

(Average Particle Diameter)

In this aspect, the average particle diameter of particles is a number average particle diameter, as described in the first aspect.

"Inkjet recording material"

The thus obtained ink-jet recording material of this aspect is preferably used as an ink-jet recording material available instead of photography, illustration, or proof-printing or printing sheet, in particular. In order to make the ink-jet recording material available instead of proof-printing or printing sheet, the white hue of the surface of the recording material is adjusted in the same way as that of the ink-jet recording material of the first aspect.

Next, the third aspect of the present invention will be circumstantially explained only in terms of different points from the above-mentioned first aspect, and explanation with respect to the same points as the first aspect will be omitted.

This aspect relates to: a pigment dispersion that forms an ink-jet recording layer characterized by being prepared by mixing and dispersing a cationic compound A with a coarse-grained pigment with an average particle diameter of 1 to 30 μm to obtain an aqueous dispersion, and then adding and dispersing the aqueous dispersion to an aqueous dispersion of a cationic finely agglomerated pigment with an average particle diameter of 0.7 μm or less; a coating liquid that forms an ink-jet recording layer, containing the same; and a method for producing an ink-jet recording material, using the same.

It is preferable that the cationic finely agglomerated pigment be at least one selected from the group consisting of agglomerated fine particles of a silica-cationic compound B, agglomerated fine particles of alumina, and agglomerated fine particles of alumina hydrate.

(Cationic Compounds A and B)

As the cationic compounds A and B used in this aspect, the same cationic compounds as those exemplified in the above-mentioned first aspect are exemplified.

In this aspect, it is preferable that the dispersion liquid obtained by mixing and dispersing the cationic compound A and the coarse-grained pigment with an average particle diameter of 1 to 30 μm be added to and dispersed in the aqueous dispersion containing at least one cationic finely agglomerated pigment with an average particle diameter of 0.7 μm or less, the cationic finely agglomerated pigment being selected from the group consisting of agglomerated fine particles of silica-cationic compound B, agglomerated fine particles of alumina, and agglomerated fine particles of alumina hydrate. If the dispersion liquid is agglomerated or the viscosity thereof increases at that time, a uniform coating liquid is difficult to prepare. Accordingly, it is preferable that the agglomeration or viscosity-increase be prevented as much as possible. Even if cationic properties are exhibited in the same way, there is a possibility in which the agglomeration or viscosity-increase occurs by difference of pH or molecular structure. Accordingly, it is the most preferable that the main components of the cationic compound A and the cationic compound B have the same structure.

(Coarse-Grained Pigment with an Average Particle Diameter of 1 to 30 μm)

As the coarse-grained pigment with an average particle diameter of 1 to 30 μm (hereinafter, referred to as coarse-grained pigment), the same one as the coarse-grained pigment exemplified in the first aspect may be used. In order to realize favorable ink absorbing capability and scratch-resistance of pigment and decrease the difference between gloss degrees at a blank portion and at a portion printed with the pigment ink, a wet process silica or alumina is preferably selected. The wet process silica is the most preferable.

The average particle diameter of the coarse-grained pigment is within the range of 1 to 30 μm, preferably within the range of 1.5 to 15 μm, and even more preferably 2 to 5 μm, so as to decrease the difference between gloss degrees at a blank portion and at a portion printed with the pigment ink while maintaining the smoothness at the portion printed with the pigment ink.

In this aspect, the coarse-grained pigment is previously dispersed in the cationic compound A, so as to prevent agglomeration or viscosity-increase, which may occur at the time of adding the coarse-grained pigment to the aqueous dispersion containing the cationic finely agglomerated pigment. The cationic compound A is suitably selected from the above-mentioned cationic compounds.

When the coarse-grained pigment is previously dispersed in the cationic compound and then added to the fine pigment, a uniform dispersion liquid can be obtained without agglomeration or viscosity-increase occurring. When a coating liquid containing such a dispersion liquid is applied to form an ink-receiving top layer, the coarse-grained pigment is uniformly distributed, and excellent image-uniformity, particularly, excellent image-uniformity at a portion printed with a pigment ink, is realized.

Although the formulation amount of the cationic compound A with respect to 100 parts by mass of the coarse-grained pigment is not particularly limited, the formulation amount is preferably within the range of 1 to 30 parts by mass, and the most preferably within the range of 5 to 15 parts by mass. If the formulation amount of the cationic compound A with respect to 1100 parts by mass of the coarse-grained pigment is less than 1 part by mass, the dispersion stability tends to deteriorate. On the other hand, if the formulation amount of the cationic compound A with respect to 100 parts by mass of the coarse-grained pigment exceeds 30 parts by mass, no further improved effects tend to be realized.

The formulation amount of the coarse-grained pigment with respect to the total mass of the pigments in the coating composition is preferably within the range of 1 to 15% by mass, more preferably 1 to 10% by mass, and the most preferably 2 to 6% by mass. If the formulation amount is less than 1% by mass, there is a case in which the scratch-resistance of the pigment is insufficiently exhibited, and the difference between gloss degrees at a blank portion and at a portion printed with the pigment ink is distinguished, in particular. If the formulation amount exceeds 15% by mass, there is a case in which the scratch-resistance of the pigment is not further improved and image-quality deteriorates.

(Cationic Finely Agglomerated Pigment with an Average Particle Diameter of 0.7 μm or Less)

The cationic finely agglomerated pigment with an average particle diameter of 0.7 μm or less is at least one selected from the group consisting of agglomerated fine particles of silica-cationic compound B, agglomerated fine particles of alumina, and agglomerated fine particles of alumina hydrate. As the silica, alumina, and alumina hydrate, the same ones as those exemplified as the finely agglomerated pigment to be formulated in the ink-receiving top layer of the first aspect may be used. It is preferable that the fine pigment be a fumed silica or alumina in view of film-formability of a coating layer and image-density after printing.

As a method for producing the agglomerated fine particles of silica-cationic compound B, the same method as that of the first aspect may be adopted. It is preferable that the agglomerated fine particles be ones pulverized to have a particle size within the range of 0.01 to 0.7 μm, and more preferably 0.01 to 0.5 μm. In order to achieve a good balance between the ink absorbing capability and image-density, agglomerated fine particles composed of fumed silica and the cationic compound B are the most preferable.

Although the formulation amount of the cationic compound B with respect to 100 parts by mass of silica in the agglomerated fine particles composed of silica and the cationic compound B is not particularly limited, the formulation amount is preferably within the range of 1 to 30 parts by mass, and the most preferably within the range of 5 to 15 parts by mass. If the formulation amount of the cationic compound B with respect to 100 parts by mass of silica is less than 1 part by mass, the dispersion stability tends to deteriorate. On the other hand, if the formulation amount of the cationic compound B with respect to 100 parts by mass of silica exceeds 30 parts by mass, no further improved effects tend to be realized.

It is preferable that the cationic finely agglomerated pigment with an average particle diameter of 0.7 μm or less, selected from the group consisting of agglomerated fine particles composed of silica and cationic compound B, agglomerated fine particles of alumina, and agglomerated fine particles of alumina hydrate, be formed by agglomeration of primary particles with an average primary particle diameter of 0.003 to 0.04 μm. In order to make a dye or pigment in ink easily fixed in the outermost layer and to realize a favorable ink-absorbing rate, image-density, and gloss, the pigment is more preferably a pigment with an average particle diameter of 0.01 to 0.3 μm, formed by agglomeration of primary particles with an average primary particle diameter of 0.005 to 0.020 μm. Even more preferably, the pigment is a pigment with an average particle diameter of 0.02 to 0.2 μm, formed by agglomeration of primary particles with an average primary particle diameter of 0.007 to 0.013 μm.

Since the dye or pigment in ink generally exhibits anionic properties, a cationic compound may further be formulated in the finely agglomerated pigment selected from the group consisting of agglomerated fine particles of silica-cationic compound B, alumina, and alumina hydrate, so as to further fix the dye or pigment.

A method for adding and dispersing the dispersion liquid obtained by mixing and dispersing the cationic compound A with the coarse-grained pigment with an average particle diameter of 1 to 30 μm to the aqueous dispersion containing the cationic finely agglomerated pigment with an average particle diameter of 0.7 μm or less is not particularly limited. Although light dispersion is sufficient to realize uniform dispersion if neither agglomeration nor viscosity-increase occurs at the time of formulation, strong dispersion is effective if agglomeration or viscosity-increase occurs after formulation. It is preferable that the main components of the cationic compound A and the cationic compound B be the same, because almost neither agglomeration nor viscosity-increase occurs at the time of formulation, and uniform dispersion is easily realized.

(Binder)

When at least a binder is further formulated in the pigment dispersion that forms an ink-jet recording layer, it can be used as a coating liquid that forms an ink-Jet recording layer.

As the binder, conventionally known ones exemplified in the above-mentioned first aspect may be used. It is preferable that PVA be mainly contained in view of adhesiveness to the pigment. Moreover, in view of ink absorbing capability and cracking-preventability, PVA with a polymerization degree of 2,000 or more is preferable, and PVA with a polymerization degree of 3,500 or more and a saponification degree of 95% or more is more preferable. PVA with a polymerization degree of 4,000 or more and a saponification degree of 97% or more is the most preferable.

(Ratio of Pigment to Binder (PB Ratio))

In the case where the above-mentioned coating liquid is applied to form an ink-jet recording layer, no problems arise if the PB ratio is within the range of 3 to 10. In view of balance between the ink absorbing capability and coating film strength, the PC ratio is preferably within the range of 4 to 8, and more preferably 4 to 7. If the PB ratio is less than 3, there is a possibility in which the ink-absorbing rate cannot be controlled and beading occurs. If the PB ratio exceeds 10, the coating film strength may significantly decrease and no practical use may be served.

In the case where PVA is used as a binder, a method in which a compound having a cross-linkability with PVA is formulated to gelatinize a coating film so as to improve film-formability (prevent cracking) is effective in the same way as that of the first aspect. The content of the compound having a cross-linkability with PVA with respect to 100 parts by mass of PVA is preferably the same degree as that of the first aspect.

As a method for formulating the compound having a cross-linkability with PVA, and the compound having a cross-linkability with PVA, the same ones as those exemplified in the first aspect may be adopted.

Although the coating amount is not particularly limited, the coating amount is generally approximately 2 to 40 g/m$^2$, and preferably 3 to 20 g/m$^2$. If the coating amount is less than 2 g/m$^2$, the fixing power of a dye or pigment contained in ink as color materials may be insufficiently exhibited. If the coating amount exceeds 40 g/m$^2$, no further improved effects may be realized.

In the coating liquid, various auxiliary agents used in the art of manufacturing a general coated sheet, such as, for example, dispersants, thickeners, antifoamers, coloring agents, antistatic agents, antiseptic agents, or the like, may be suitably formulated.

(Support)

The kind, form, or size of the support available for the ink-Jet recording material of the present aspect is not particularly limited, and any of the air-permeable supports and air-impermeable supports described in the first aspect may be used.

Although the smoothness of the support is not particularly limited, it is preferable that the Bekk smoothness be at least 300 seconds (Ohken-type, J. TAPPI No. 5) so as to realize a surface with high gloss and high smoothness. Also, although the opacity of the base material is not particularly limited, it is preferable that the opacity (in accordance with JIS P8138) be 85% or more, and more preferably 93% or more, so as to realize an appearance equivalent to that of silver halide photography (particularly, visually-appreciated whiteness degree).

(Recording Layer)

A recording layer formed by mainly applying the coating liquid prepared by the production method of the present aspect is preferably the outermost layer (ink-receiving top layer).

In addition to the recording layer formed by mainly applying the coating liquid of the present aspect, another coating layer may be formed so as to improve absorbing capability or adherence to the support. The other coating layer may be a single layer or a multilayer. The other coating layer may be formed in the same way as that of the coating layers except the ink-receiving top layer of the first aspect.

Also, the hue control, colored pigment, coating method, average particle diameter, ink, and the like, are the same as those described in the first aspect.

Next, the fourth aspect of the present invention will be circumstantially explained only in terms of different points from the above-mentioned first aspect, and explanation with respect to the same points as the first aspects will be omitted.

The ink-jet recording material of the fourth aspect contains: a support; and at least two ink-receiving layers of an ink-receiving underlayer and an ink-receiving top layer, the ink-receiving layers being disposed on the support and each containing a pigment and a binder, and is characterized in that: the ink-receiving underlayer contains at least a pigment A and a pigment B, the pigment A having a BET specific surface area of less than 100 $m^2/g$, the pigment B having a BET specific surface area of no less than 100 $m^2/g$, and the content ratio of the pigment A to the pigment B being within a range of 9/1 to 1/9; and the ink-receiving top layer contains a finely agglomerated pigment with an average particle diameter of 0.008 to 0.7 μm and a binder, the finely agglomerated pigment being selected from the group consisting of a silica, an alumina, and an alumina hydrate.

(Support)

As the support in the present aspect, any of the air-permeable supports and air-impermeable supports described in the first aspect may be suitably selected depending on the use application or intended use, for example.

(Ink-Receiving Underlayer)

The main purpose and effects of formulating the pigment A and the pigment B in the ink-receiving underlayer will be explained.

The main purpose in the ink-receiving underlayer is to separate and absorb a solvent in ink and to realize the smoothness of the recording material. Since the BET specific surface area of the pigment A is less than 100 $m^2/g$ and so the ink absorbing capability is small, the pigment A contributes to realize the smoothness of the recording material and prevent occurrence of roughness of the recording material after printing. On the other hand, since the BET specific surface area of the pigment B is no less than 100 $m^2/g$, the pigment B contributes to rapidly separate and absorb the solvent in ink. By combinationally formulating the pigment A and the pigment B in a ratio (A/B) of 9/1 to 1/9, preferably 8/2 to 2/8, and more preferably 6/4 to 4/6, effects can be synergistically exhibited.

The BET specific surface area of the fine pigment is determined by drying the fine pigment at 105° C. to obtain a powdery sample, subjecting the powdery sample to vacuum deaeration for 2 hours at 200° C. using a device manufactured by Coulter, Inc., under the trade name of SA3100 type, measuring nitrogen adsorption and nitrogen desorption to determine a nitrogen adsorption/desorption isotherm, and then calculating the specific surface area in accordance with a t-method. The specific surface area is a surface area per unit mass of the fine pigment. It is assumed that the size of a primary particle decreases, the configuration of a secondary particle tends to be complicated, the capacity of a fine pore increases, and therefore the ink absorbing capability is improved, in accordance with the increase of the specific surface area.

(Pigment A in Ink-Receiving Underlayer)

As the pigment A, various pigments well-known and used in the art of a general coated sheet, such as, for example, a fumed silica, wet process silica, colloidal silica, mesoporous silica, alumina, alumina hydrate, aluminosilicate, kaolin, clay, sintered clay, zinc oxide, tin oxide, magnesium sulfate, aluminum hydroxide, calcium carbonate, satin white, aluminum silicate, smectite, zeolite, magnesium silicate, magnesium carbonate, magnesium oxide, diatomaceous earth, styrene-based plastic pigment, or urea resin-based plastic pigment, may be used.

The smoothness of the recording material is further improved by using a pigment with an oil absorption of 10 to 100 ml/1100 g, more preferably using a pigment with a shape of flat board, from the standpoint of the smoothness and cockling-preventability of the recording material. As the kind of the pigment, a kaolin is particularly preferable. The average particle diameter is preferably 10 μm or less, more preferably 0.05 to 2 μm, and even more preferably 0.1 to 1 μm.

The term "oil absorption" means an oil absorption exhibited by 100 g of a pigment, the oil absorption being measured in accordance with a method defined in JIS-K-5101. In the present aspect, the average particle diameter of the pigment is a number average particle diameter, as described in the first aspect.

(Pigment B in Ink-Receiving Underlayer)

As the pigment B, various pigments well-known and used in the art of a general coated sheet may be used in the same way as that of the pigment A. In particular, a fine silica with an average particle diameter of 0.008 to 0.7 μm is preferably used from the standpoint of the ink absorbing capability of the recording material.

(Binder)

As the binder to be contained in the ink-receiving underlayer, conventionally known ones as exemplified as the binder to be formulated in the ink-receiving underlayer of the first aspect may be used.

Although the coating amount of the ink-receiving underlayer is not particularly limited, the coating amount is generally adjusted to be approximately 1 to 30 $g/m^2$, and preferably 3 to 20 $g/m^2$. If the coating amount is extremely small, there is a possibility in which the ink absorbing capability is insufficiently exhibited. If the coating amount is extremely large, there is a possibility in which the position of a peak in fine pore diameter distribution of the ink-receiving top layer cannot be substantially controlled to exist in the region of 0.06 μm or less.

(Formation of Ink-Receiving Top Layer)

In the following, an object of providing the ink-receiving top layer, a constitution thereof, and a method for forming the same will be explained.

The ink-receiving top layer can fix a dye or pigment in ink without generating any spots because a solvent is rapidly separated in the ink-receiving underlayer. The ink-receiving top layer serves to rapidly fix the dye or pigment in ink, and realize high color development (high print density) and uniform image (round dot). By formulating a finely agglomerated pigment with an average particle diameter of 0.008 to 0.7 μm, selected from the group consisting of silica, alumina, and alumina hydrate, with a water-soluble resin in the ink-receiving top layer, the further-improved color development and further uniform image can be realized. The ink-receiving underlayer and the ink-receiving top layer are functionally separated, and the thus obtained ink-jet recording material exhibits a rapid ink-absorbing rate and extremely excellent image-uniformity.

The ink-receiving top layer of the present aspect is formed so that the peak in the fine pore diameter distribution curve substantially exists in the region of 0.06 μm or less, that is, no cracking occurs in the coating film, and continuous films with the pigment, binder, and the like, are formed.

The film-formation of the ink-receiving top layer is a very important point of the present aspect.

The ink-receiving top layer having such a constitution is formed by increasing the viscosity of a coating composition or cross-linking the coating composition, while applying the coating composition, or during drying the coating composition applied and before the coating composition exhibits a decrease in drying rate.

In the present aspect, the method for increasing the viscosity of the coating composition or cross-linking the coating composition, while applying the coating composition, or during drying the coating composition applied and before the coating composition exhibits a decrease in drying rate, is not particularly limited. A method in which a coating composition containing a hydrophilic resin which forms a hydrogel by electron irradiation is applied to form a coating layer, and the viscosity of the coating layer is increased (hydrogel is formed) by electron irradiation, immediately after applying the coating composition, or during drying the coating layer but before the coating layer exhibits a decrease in drying rate; a method in which a coating composition for an ink-receiving top layer containing PVA is applied, and the viscosity of the coating composition is increased or the coating composition is cross-linked using a compound having a cross-linkability with PVA, immediately after applying the coating composition, or during drying the coating layer and before the ink-fixing layer exhibits a decrease in drying rate; or a method in which a coating composition containing a temperature-sensitive polymer (which exhibits hydrophilicity in the temperature region no higher than a certain temperature (temperature-sensitive point) but exhibits hydrophobicity in the temperature region higher than the temperature-sensitive point, as disclosed in Japanese Laid-Open Patent Application No. 2003-40916) as a binder is applied, and then the temperature of the coating composition applied is lowered to increase the viscosity thereof, is preferably adopted.

In order to realize image-quality equivalent to that of a photography, the transparency of a coating layer that fixes a dye or pigment in ink is required. In accordance with the enhancement of the transparency of the coating layer, the dye fixed therein looks excellent from the outside thereof, and therefore the image-length (that is, depth) increases, as a result of which an image-quality approximate to that of a silver halide photography is realized.

(Pigment to be Formulated in Ink-Receiving Top Layer)

As the finely agglomerated pigment to be formulated in the ink-receiving top layer, the same ones as those exemplified as the finely agglomerated pigment to be formulated in the ink-receiving top layer of the first aspect may be used, for example. Among them, a fumed silica is preferably used in view of the coating-film formability or image density after printing.

(Binder)

As a binder to be contained in the ink-receiving top layer, the same ones as those exemplified as the binder to be formulated in the ink-receiving top layer of the first aspect may be preferably used, for example.

In order to fix a dye or pigment contained in ink, a cationic compound available in the ink-receiving underlayer may be formulated in the ink-receiving top layer. As the cationic compound, the same ones as those described in the first aspect may be preferably used, for example. Also, the cationic compound may be formulated in the ink-receiving underlayer to fix a dye, because a slight amount of the dye is fixed therein accompanying solvent-absorption.

It is preferable that the finely agglomerated pigment to be formulated in the ink-receiving top layer of the present aspect be a silica-cationic compound agglomerated fine particle prepared by mixing and agglomerating a silica with a cationic compound to form a silica-cationic compound agglomerated particle, and then pulverizing it to have an average particle diameter of 0.7 μm or less, and preferably within the range of 0.01 to 0.5 μm. In that case, the silica is preferably a fumed silica, and the cationic compound is suitably selected from the above-mentioned cationic compounds. In particular, five-membered amidines or aluminium salts, such as, for example, polyaluminium chloride, polyaluminium acetate, or polyaluminium lactate, are preferably used, in view of a capability of fixing the dye or pigment in ink, and dispersibility.

In addition to the pigment and the binder, various auxiliary agents used in the art of manufacturing a general coated sheet, such as, for example, dispersants, thickeners, antifoamers, coloring agents, antistatic agents, or antiseptic agents, may be suitably formulated.

Although the coating amount of the ink-receiving top layer is not particularly limited, the coating amount is generally adjusted to be approximately 2 to 40 $g/m^2$, and preferably 3 to 15 $g/m^2$. If the coating amount of the ink-receiving top layer is extremely small, the fixing power of the dye or pigment contained in ink as color materials tends to be insufficient. If the coating amount is extremely large, no further improved effects tend to be realized.

In order to obtain a glossy ink-jet recording material, a method in which the ink-receiving top layer in a wet state or a third coating layer provided on the ink-receiving top layer in a wet state is brought into press contact with a heated mirror drum and then dried, a so-called casting method, is effectively adopted. In the case where the third coating layer is provided on the ink-receiving top layer, at least one kind of pigment selected from the group consisting of an alumina, alumina hydrate, both with an average secondary particle diameter of 1 μm or less, a fumed silica, gel-type silica, both with an average secondary particle diameter of 0.7 μm or less, and a monodispersed colloidal pigment with an average primary particle diameter of 0.01 to 0.06 μm, is formulated as the main component of the third coating layer.

The gel-type silica is prepared, for example, by mixing sodium silicate prepared from a silica sand having a high-purity with sulfuric acid and then forming a silica sol in the acidic region. The silica sol gradually polymerizes to form a primary particle, and then three-dimensionally agglomerates to be gelatinized. This silica is washed with water and the dried, followed by finely pulverizing to a micron size to obtain a gel-type amorphous silica.

The monodispersed colloidal pigment is composed of fine particles composed of only primarily particles without secondarily agglomerating. As the monodispersed colloidal pigment, cheap colloidal silicas are preferably used. Among them, acidic colloidal silicas are preferably used because of their favorable capability of developing dye. Moreover, cationized acidic colloidal silicas are preferably used, because of their favorable capability of fixing a pigment ink.

A generally commercially available release agent, such as, for example, a stearic acid amide, polyethylene wax, or ammonium oleate, may be suitably formulated so that the coating layer is easily separated from a mirror drum. In particular, a cationic release agent is preferably used. Although the formulation amount of the release agent is not particularly limited, 0.5 to 10 parts by mass of the release agent is generally formulated with respect to 100 parts by mass of the pigment.

In order to obtain an ink-jet recording material with a suppressed gloss (semi-gloss type), particularly an ink-jet recording material for proof-printing, it is effective that a coarse-grained pigment be formulated in at least one layer of the coating layers, preferably in the ink-receiving top layer. Although the coarse-grained pigment is not particularly limited, an inorganic pigment is preferably used. Although the average particle diameter is not particularly limited, it is preferable that the average particle diameter be 0.7 μm or more, and more preferably 1 to 30 μm, in view of gloss-suppression effects. Also, in view of gloss-suppression effects, it is preferable that the formulation amount of the coarse-grained pigment be 0.1 to 15% by mass with respect to the total solid mass of the coating layer.

It is preferable that the coating mass ratio of the ink-receiving underlayer to the ink-receiving top layer (ink-receiving underlayer/ink-receiving top layer) be within the range of 100/300 to 100/30, and more preferably 100/100 to 100/50, in order to functionally separate the ink-receiving underlayer from the ink-receiving top layer so that the ink-receiving underlayer serves to absorb the solvent component in ink and the ink-receiving top layer serves to fix the dye or pigment in ink.

(Ratio of Pigment to Binder (Pigment/Binder) (PB Ratio))

If the PB ratio of the ink-receiving underlayer is within the range of 2 to 5, no problems arise. The PB ratio is preferably within the range of 2.2 to 4, and more preferably 2.5 to 3.5, in view of balance between the ink absorbing capability and coating-film strength. If the PB ratio is less than 2, there is a possibility in which the ink-absorbing rate cannot be controlled and beading occurs. If the PB ratio exceeds 4, the coating film strength may significantly decrease and no practical use may be served.

Although the PB ratio of the ink-receiving top layer is not particularly limited, provided that the ink absorbing capability is not deteriorated, the PB ratio is preferably within the range of 4 to 12, more preferably 4.5 to 9, and even more preferably 5 to 8. If the PB ratio is less than 4, there is a possibility in which the ink-absorbing rate is insufficient. If the PB ratio exceeds 12, there is a possibility in which the coating film is cracked.

In order to realize a favorable balance between the ink absorbing capability and coating film strength, it is preferable that the PB ratio of the ink-receiving top layer be larger than that of the ink-receiving underlayer, and the value calculated by dividing the PB ratio of the ink-receiving top layer by the PB ratio of the ink-receiving underlayer be within the range of 1.2 to 4.5, more preferably 1.5 to 3, and even more preferably 1.7 to 2.5.

(Other Coating Layers)

In the present aspect, another coating layer may be provided between the support and the ink-receiving underlayer so as to improve adherence between the base material and the ink-receiving underlayer and further improve the ink absorbing capability. Also, a rear layer may be provided so as to improve the preventability of curling or improve conveyability. Also, a polyethylene layer may be provided on the rear layer so as to provide photographic texture.

(Coating Apparatus and Coating Method)

A coating apparatus and coating method to be adopted are the same as described in the first aspect.

(Calendering Treatment)

The surface roughness, glossy appearance, and smooth texture, of the ink-jet recording material can be improved by subjecting at least one coating layer to smoothing treatment using a calendar by applying pressure in the same way as that of the first aspect.

In the present aspect, the obtained ink-jet recording material can be preferably used for proof printing by controlling the white hue of the surface thereof in the same way as that of the first aspect so that the whiteness degree measured in accordance with JIS P8148 is 80 to 90%, the sensory chromaticity index a* is −1 to 2, and the sensory chromaticity index b* is −2.5 to 1.0.

EXAMPLES

In the following, the present invention will be more circumstantially explained by way of examples. However, the present invention is not limited to these. Herein, the terms "parts" and "%" indicate "parts by mass" and "% by mass" of solid content free from water, respectively, unless otherwise so indicated.

[Silica Fine Particle A]

A finned silica with an average particle diameter of 1.0 μm (manufactured by NIPPON AEROSIL CO., LTD., under the trademark of AEROSIL A300, having an average primary particle diameter of approximately 0.008 μM) was dispersed using a sand mill, and then further dispersed using a pressure-type homogenizer. The dispersing procedures using the sand mill and the pressure-type homogenizer were repeatedly performed until the average particle diameter was 0.08 μm, and then a 10% aqueous dispersion was prepared. To the 10% aqueous dispersion, 10 parts of a cationic compound with a five-membered amidine structure (manufactured by HYMO Co., Ltd., under the trade name of SC-700, having a molecular weight of 300,000) was added, and then dispersed using the sand mill, followed by further dispersing using the pressure-type homogenizer. The dispersing procedures using the sand mill and the pressure-type homogenizer were repeatedly performed until the average particle diameter was 0.15 μm, and then a 10% aqueous dispersion was prepared.

[Silica Fine Particle B]

To a 10% aqueous dispersion of a fumed silica with an average particle diameter of 1.0 μm (manufactured by NIPPON AEROSIL CO., LTD., under the trademark of AEROSIL A300, having an average primary particle diameter of approximately 0.008 μm), 10 parts of a cationic compound with a five-membered amidine structure (manufactured by HYMO Co., Ltd., under the trade name of SC-700, having a molecular weight of 300,000) was added, and then dispersed using a homomixer until the average particle diameter was 0.9 μm. Then, a 10% aqueous dispersion was prepared.

Example 1

[Coating Liquid A]

4 parts of a coarse-grained pigment (precipitated silica having an average particle diameter of 1.5 μm, manufactured by TOKUYAMA Corp., under the trademark of FINESIL F-80) was mixed and dispersed with 100 parts of the silica fine particle A, and then 18 parts of PVA (manufactured by KURARAY CO., LTD., under the trade name of PVA-135, having a polymerization degree of 3,500 and a saponification degree of 98.5%) as a binder was mixed therewith. Then, an 8% dispersion liquid was prepared.

[Coating Liquid B]

40 parts of an acrylic emulsion latex was mixed with 100 parts of a gel-type silica having an average particle diameter of 0.3 μm (manufactured by W. R. Grace & Co., under the trade name of 703A), and then a 20% dispersion liquid was prepared.

[Preparation of Ink-Jet Recording Material]

The coating liquid B was applied on a paper support (manufactured by Oji Paper Co. Ltd., under the trademark of MARSHMALLOW, 104.7 $g/m^2$) in a coating amount of 15 $g/m^2$ and then dried, followed by subjecting it to smoothing treatment by applying a pressure at 100 kg/cm using a calendar to form an ink-receiving underlayer. On the ink-receiving underlayer, a 4% borax aqueous solution was applied in a coating amount of 0.15 $g/m^2$, and then the coating liquid A was applied thereon in a coating amount of 10 $g/m^2$, by a wet-on-wet coating method (in which two or more layers are formed by coating the upper layer on the lower layer while the lower layer is not dried), followed by drying to form an ink-receiving top layer. Thus, an ink-jet recording material was prepared.

Example 2

[Coating Liquid C]

10 parts of a cationic compound with a five-membered amidine structure (manufactured by HYMO Co., Ltd., under the trade name of SC-700, having a molecular weight of 300,000) was added to 100 parts of the coarse-grained pigment described in Example 1, and then dispersed to prepare a 10% dispersion liquid (1). To 100 parts of the silica fine particle A, 4 parts of the dispersion liquid (1) was added and dispersed, followed by mixing therewith 18 parts of PVA (manufactured by KURARAY CO., LTD., under the trade name of PVA-135) as a binder to prepare an 8% dispersion liquid.

An ink-jet recording material was prepared in a similar way to that of Example 1, except that the coating liquid C was used instead of the coating liquid A.

Example 3

An ink-jet recording material was prepared in a similar way to that of Example 2, except that a precipitated silica with an average particle diameter of 3 μm was used instead of the coarse-grained pigment.

Example 4

An ink-jet recording material was prepared in a similar way to that of Example 2, except that a precipitated silica with an average particle diameter of 15 μm was used instead of the coarse-grained pigment.

Example 5

An ink-jet recording material was prepared in a similar way to that of Example 2, except that a precipitated silica with an average particle diameter of 25 μm was used instead of the coarse-grained pigment.

Example 6

An ink-jet recording material was prepared in a similar way to that of Example 2, except that an alumina (manufactured by Cabot Corporation, under the trade name of PO-003) with an average particle diameter of approximately 0.2 μm was used instead of the silica fine particle A in the ink-receiving top layer.

Example 7

An ink-jet recording material was prepared in a similar way to that of Example 2, except that an alumina hydrate (manufactured by Catalysts & Chemicals Industries Co., Ltd., under the trade name of AS-3) with an average particle diameter of approximately 0.5 μm was used instead of the silica fine particle A in the ink-receiving top layer.

Example 8

An ink-jet recording material was prepared in a similar way to that of Example 2, except that a kaolin (manufactured by ENGELHARD CORPORATION, under the trademark of ULTRA WHITE 90, having an average particle diameter of 0.5 μm, an oil absorption of 46 ml/100 g, and a specific surface area of 14 $m^2/g$) was used instead of the gel-type silica with an average particle diameter of 0.3 μm.

Example 9

An ink-jet recording material was prepared in a similar way to that of Example 2, except that a colloidal silica (manufactured by NISSAN CHEMICAL INDUSTRIES, LTD., under the trademark of SNOWTEX ST-YL, having an average particle diameter of 0.065 μm) was used instead of the gel-type silica with an average particle diameter of 0.3 μm.

Example 10

An ink-jet recording material was prepared in a similar way to that of Example 2, except that a mixture composed of 50 parts of the gel-type silica with an average particle diameter of 0.3 μm and 50 parts of the kaolin (manufactured by ENGELHARD CORPORATION, under the trademark of ULTRA WHITE 90) was used instead of 100 parts of the gel-type silica with an average particle diameter of 0.3 μm in the ink-receiving underlayer.

Example 11

An ink-jet recording material was prepared in a similar way to that of Example 10, except that 0.02 parts of a blue-based colored pigment (manufactured by TOYO INK MFG. CO., LTD., under the trade name of EMT BLUE DS 18) and 0.05 parts of a violet-based colored pigment (manufactured by TOYO INK MFG. CO., LTD., under the trade name of EMT VIOLET BE) were formulated with respect to 100 parts of the pigment in the ink-receiving underlayer.

Example 12

An ink-jet recording material was prepared in a similar way to that of Example 10, except that 0.02 parts of the blue-based colored pigment (manufactured by TOYO INK MFG. CO., LTD., under the trade name of EMT BLUE DS 18), 0.04 parts of the violet-based colored pigment (manufactured by TOYO INK MFG. CO., LTD., under the trade name of EMT VIOLET BE), and 0.02 parts of a yellow-based colored pigment (manufactured by TOYO INK MFG. CO., LTD., under the trade name of EMT YELLOW 5G) were formulated with respect to 100 parts of the pigment in the ink-receiving underlayer.

Example 13

An ink-jet recording material was prepared in a similar way to that of Example 10, except that 0.02 parts of the blue-based colored pigment (manufactured by TOYO INK MFG. CO., LTD., under the trade name of EMT BLUE DS 18), 0.04 parts of a red-based colored pigment (manufactured by TOYO INK MFG. CO., LTD., under the trade name of EMT RED KBS), and 0.02 parts of the yellow-based colored pigment (manufactured by TOYO INK MFG. CO., LTD., under the trade name of EMT YELLOW 50) were formulated with respect to 100 parts of the pigment in the ink-receiving underlayer.

Example 14

An ink-jet recording material was prepared in a similar way to that of Example 10, except that 0.02 parts of the blue-based colored pigment (manufactured by TOYO INK MFG. CO., LTD., under the trade name of EMT BLUE DS 18), 0.04 parts of the violet-based colored pigment (manufactured by TOYO INK MFG. CO., LTD., under the trade name of EMT VIOLET BE), and 0.02 parts of the yellow-based colored pigment (manufactured by TOYO INK MFG. CO., LTD., under the trade name of EMT YELLOW 5G) were formulated with respect to 100 parts of the pigment in the ink-receiving top layer.

Comparative Example 1

An ink-jet recording material was prepared by applying a 4% borax aqueous solution on a paper support (manufactured by Oji Paper Co., Ltd., under the trademark of MARSHMALLOW, 104.7 g/m$^2$) in a coating amount of 0.15 g/m$^2$, and then the coating liquid A was applied thereon in a coating amount of 15 g/m$^2$, by a wet-on-wet coating method, followed by drying.

Comparative Example 2

An ink-jet recording material was prepared in a similar way to that of Example 1, except that no coarse-grained pigment was formulated.

Comparative Example 3

An ink-jet recording material was prepared in a similar way to that of Example 1, except that the silica fine particle B was used instead of the silica fine particle A.

Comparative Example 4

An ink-jet recording material was prepared in a similar way to that of Example 1, except that the colloidal silica (manufactured by NISSAN CHEMICAL INDUSTRIES, LTD., under the trade name of ST-YL) with an average particle diameter of 0.065 μm was used instead of the silica fine particle A.

Comparative Example 5

An ink-jet recording material was prepared in a similar way to that of Example 1, except that a silica with an average particle diameter of 0.8 μm (prepared by pulverizing and dispersing the coarse-grained pigment described in Example 1) was used instead of the coarse-grained pigment.

Comparative Example 6

An ink-jet recording material was prepared in a similar way to that of Example 1, except that a precipitated silica with an average particle diameter of 35 μm was used instead of the coarse-grained pigment.

Comparative Example 7

An ink-jet recording material was prepared in a similar way to that of Example 1, except that the formulation amount of the coarse-grained pigment was changed to 0.8 parts.

Comparative Example 8

An ink-jet recording material was prepared in a similar way to that of Example 1, except that the formulation amount of the coarse-grained pigment was changed to 16 parts.

[Evaluation Method 1]

The ink-jet recording materials prepared in Examples 1 to 14 and Comparative Examples 1 to 8 were evaluated in accordance with the following methods in terms of the surface smoothness, ink absorbing capability, recorded image quality realized when dye and pigment inks are used, scratch-resistance of pigment ink, difference between gloss degrees at a blank portion and at a portion printed with a pigment ink, and color tone stability.

[Used Printer]

Dye ink-jet printer: manufactured by SEIKO EPSON CORPORATION, as model No. PM-G800, used in print mode of photo paper fine mode.

Pigment ink-jet printer: manufactured by SEIKO EPSON CORPORATION, as model No. PX-6000, used in print mode of PX-MC photo paper (with a thickness and fine gloss) mode.

(Smoothness of Blank Paper)

Each ink-jet recording material was visually and texturally evaluated in the following three stages.

A: Smoothness approximately equal to or superior to that of a glossy coated paper was realized.

B: Smoothness approximately equal to that of a dull mat coated paper was realized.

C: Smoothness inferior to that of a dull mat coated paper was realized.

(Ink Absorbing Capability)

Green ink and blue ink were solidly printed on each ink-jet recording material using the above-mentioned two kinds of printer, followed by visually observing the ink absorbing capability to evaluate it in accordance with the following criteria.

A: Rapid ink-absorbing rate was realized, and neither overflow nor beading of ink occurred.

B: Beading slightly occurred, however, no practical problems arose.

C: Overflow and beading of ink occurred.

(Recorded Image Quality)

A black solid printing part was subjected to measuring using a Macbeth reflection densitometer (Macbeth RD-920) to determine the print density.

(Scratch-Resistance of Pigment Ink)

A printed portion (subjected to black solid printing) with a pigment ink was scraped with a cotton-tipped swab to evaluate it in accordance with the following criteria.

A: No ink was scraped away, and no problems arose.

B: Ink was slightly scraped away, but no practical problems arose.

C: Ink was scraped away, and practical problems arose.

(Difference Between Gloss Degrees at a Blank Portion and at a Portion Printed with a Pigment Ink)

The gloss was visually observed at a printed portion (subjected to each color solid printing) with a pigment ink and a white paper portion to evaluate it in accordance with the following criteria.

A: Difference between the gloss degrees at the two portions was hardly recognized.

B: Difference between the gloss degrees at the two portions was recognized, but could be ignored.

C: Difference between the gloss degrees at the two portions was large.

(ΔE: Color Tone Stability)

A printed portion (subjected to cyan solid printing) with a pigment ink was subjected to measuring with respect to ΔE at 24 hours after the printing (see, "New edition Chromochemical Handbook" (second edition) published by University of Tokyo press, page 257 (1998)). Although the ΔE is preferably small, the change of color tone is not generally noticed if the ΔE is less than 3.

[Evaluation Method 2]

Each ink-jet recording material of Examples 10 to 14 was evaluated using a blank paper thereof and a printed matter thereof obtained using a pigment ink-jet printer (ISO-400 image, "High-resolution color digital standard image data ISO/JIS-SCID", page 13, image name: fruit and basket), in comparison with a glossy coated paper A2 for printing (manufactured by Oji Paper Co., Ltd., under the trade name of OK TOPCOAT+, 127.9 g/m$^2$) and an offset-printed matter thereof (the same image as the above-mentioned image). Results are shown in Table 2.

(White Hue)

The white hue of each sample was visually compared with that of the glossy coated paper A2 and the hue tendency is shown in Table 2.

(Whiteness Degree and Sensory Chromaticity Index)

The whiteness degree of the surface of each ink-jet recording material was measured in accordance with a method defined in JIS P8148, and the sensory chromaticity index a* and the sensory chromaticity index b* were measured in accordance with a method defined in JIS P8722.

(Preservability of White Paper)

The change of white hue was visually checked after leaving each sample for three months on a desk in a general office while keeping the face to be recorded of the ink-jet recording material upward.

TABLE 1

| | Smoothness of blank sheet | Ink absorbing capability | Recorded image quality: Dye | Recorded image quality: Pigment | Scratch-resistance of pigment ink | Difference between blank portion gloss and pigment-ink printed portion gloss | ΔE |
|---|---|---|---|---|---|---|---|
| Example 1 | B | A | 2.00 | 1.88 | A | A | 1.0 |
| Example 2 | A | A | 2.13 | 2.01 | A | A | 0.9 |
| Example 3 | A | A | 2.07 | 1.97 | A | A | 0.9 |
| Example 4 | A | A | 2.01 | 1.93 | A | A | 0.9 |
| Example 5 | B | A | 1.92 | 1.85 | A | A | 0.9 |
| Example 6 | A | A | 1.90 | 2.00 | A | A | 1.3 |
| Example 7 | A | A | 2.03 | 1.98 | A | A | 1.2 |
| Example 8 | A | A | 1.95 | 2.00 | A | A | 1.3 |
| Example 9 | A | A | 2.11 | 2.05 | A | A | 1.1 |
| Example 10 | A | A | 2.10 | 2.03 | A | A | 1.0 |
| Example 11 | A | A | 2.10 | 2.01 | A | A | 1.0 |
| Example 12 | A | A | 2.10 | 2.00 | A | A | 1.0 |
| Example 13 | A | A | 2.07 | 2.00 | A | A | 1.0 |
| Example 14 | A | A | 1.92 | 1.97 | A | A | 1.2 |
| Comparative Example 1 | A | B | 2.02 | 1.75 | A | A | 3.5 |
| Comparative Example 2 | A | A | 2.10 | 2.13 | C | B | 1.0 |
| Comparative Example 3 | A | A | 1.75 | 1.94 | A | A | 1.0 |
| Comparative Example 4 | A | C | 1.87 | 1.98 | B | B | 1.3 |
| Comparative Example 5 | A | A | 2.00 | 2.02 | C | B | 1.0 |
| Comparative Example 6 | C | A | 1.83 | 1.69 | A | A | 1.0 |
| Comparative Example 7 | A | A | 2.02 | 2.01 | C | B | 1.0 |
| Comparative Example 8 | C | A | 1.81 | 1.76 | A | A | 1.0 |

TABLE 2

| | White hue | Preservability of white paper | Whiteness degree | Chromaticity index a* | Chromaticity index b* |
|---|---|---|---|---|---|
| Glossy coated paper A2 | — | Approximately unchanged | 85.0 | 0.84 | −1.71 |
| Example 10 | White | Approximately unchanged | 92.5 | 0.20 | 0.75 |
| Example 11 | Blue-white | Approximately unchanged | 93.1 | 2.42 | −6.30 |
| Example 12 | Approximately same hue | Approximately unchanged | 85.7 | 0.81 | −1.72 |
| Example 13 | Approximately same hue | Approximately unchanged | 87.3 | 0.90 | −1.90 |
| Example 14 | Similar hue, however, color unevenness occurred | Significantly changed | 85.2 | 0.94 | −2.00 |

It is apparent from Table 1 that the ink-jet recording materials according to the first aspect of the present invention were excellent in surface smoothness, ink absorbing capability, recorded image quality realized when dye and pigment inks are used, scratch-resistance of pigment ink, and color tone stability, and exhibited a small difference between blank portion gloss and pigment-ink printed portion gloss. Moreover, it is apparent from Table 2 that the ink-jet recording materials according to the first aspect of the present invention had a good appearance, and, when the colored pigments were formulated, exhibited whiteness degree and color tone equivalent to those of a coated sheet for printing, and were available as excellent ink-jet sheets alternative to proof-printing paper or general-printing paper.

[Support A]

A needle-leaved tree bleached kraft pulp (NBKP) beaten to 250 ml CSF (JIS P 8121) and a broad-leaved tree bleached kraft pulp (LBKP) beaten to 280 ml CSF were mixed in a weight ratio of 2:8 to prepare a 0.5% pulp slurry. To the pulp slurry, 2.0% of canonized starch, 0.4% of alkyl ketene dimer, 0.1% of anionized polyacrylamide resin, and 0.7% of polyamide polyamine epichlorohydrin resin, with respect to the total dry weight of the pulp, were added, and sufficiently stirred to disperse them.

The thus prepared pulp slurry was made into paper using a Fourdrinier paper making machine, passed through a drier, size-presser, and machine calendar to obtain a base paper with a basis weight of 100 g/m$^2$ and a density of ID g/cm$^3$. The size-pressing liquid used in the size-pressing process was prepared as a 5% solution by mixing a carboxyl-modified PVA and sodium chloride in a weight ratio of 2:1, followed by adding water to the mixture, and then heating to dissolve them. This size-pressing liquid was applied on both surfaces of the paper in the total amount of 25 cc to obtain a support A.

[Support B]

Both surfaces of the support A were subjected to a corona discharge treatment, and then the felt side of the support A was coated with a polyolefin resin composition 1 subjected to mixing and dispersing using a Banbury mixer, as described below, in a coating amount of 18 g/m$^2$. The wire side of the support A was coated with a polyolefin resin composition 2 (resin composition that forms a rear face) in a coating amount of 30 g/m$^2$ using a melt extruder equipped with a T-die (melting temperature: 320° C.). Then, the felt side thereof was cooled to be solidified with a mirrored surface of a cooling roll, and the wire side was cooled to be solidified with a rough surface of the cooling roll. Thus, a support B coated with the resin, the support B having a smoothness (Ohken-type, J. TAPPI No. 5) of 6,000 seconds and an opacity (JIS P8138) of 93%, was obtained.

(Polyolefin resin composition 1)

35 parts of a long-chain low-density polyethylene resin (with a density of 0.926 g/cm$^3$ and a melt index of 20 g/10 minutes), 50 parts of a low-density polyethylene resin (with a density of 0.919 g/cm$^3$ and a melt index of 2 g/10 minutes), 15 parts of anatase-type titanium dioxide (manufactured by ISHIHARA SANGYO KAISHA, LTD., under the trade name of A-220), 0.1 parts of zinc stearate, 0.03 parts of antioxidant (manufactured by Ciba-Geigy K.K., under the trademark of IRGANOX 1010), 0.09 parts of ultramarine blue (manufactured by DAIICHI KASEI CO., LTD., under the trade name of blue ultramarine blue No. 2000), and 0.3 parts of a fluorescent brightener (manufactured by Ciba-Geigy K.K., under the trademark of UVITEX OB) were mixed.

(Polyolefin resin composition 2)

65 parts of a high-density polyethylene resin (with a density of 0.954 g/cm$^3$ and a melt index of 20 g/10 minutes) and 35 parts of a low-density polyethylene resin (with a density of 0.924 g/cm$^3$ and a melt index of 4 g/10 minutes) were mixed.

[Silica Dispersion Liquid c]

To 1,000 g of a 1% aqueous solution of ammonium hydrochloride of polyvinyl amine copolymer having a five-membered amidine structure as a cationic compound (manufactured by HYMO Co., Ltd., under the trade name of HYMAX SC-700M, with a molecular weight of approximately 300,000, primary amine), 110 g of a wet process powdery silica with an average particle diameter of 3 μm (obtained by a precipitation method, manufactured by TOKUYAMA Corp., under the trademark of FINESIL X-30) was gradually added while stirring, and then dispersing using a homomixer (at a rotation rate of 1,500 rpm) for 30 minutes.

[Dispersion Liquid C of Silica-Cationic Compound Agglomerated Fine Particle]

A commercially available fumed silica (manufactured by TOKUYAMA Corp., under the trademark of REOLOSIL QS-30, with a specific surface area of 300 m$^2$/g and an average primary particle diameter of approximately 9 nm) was dispersed and pulverized in water using a homomixer and then pulverized and dispersed using a nanomizer. These processes were combinationally repeated, and then the obtained dispersion liquid was classified to prepare a 10% dispersion liquid of the silica fine particles with an average secondary diameter of 50 nm.

9 parts (in solid basis) of ammonium hydrochloride of polyvinyl amine copolymer having a five-membered amidine structure as a cationic compound (manufactured by HYMO Co, Ltd., under the trademark of HYMAX SC-700M, with a molecular weight of approximately 30,000) was mixed with 100 parts of the dispersion liquid in silica solid basis to obtain an agglomerated dispersion liquid with an increased-viscosity. The agglomerated dispersion liquid with an increased-viscosity was dispersed again using a homomixer, and then further pulverized and dispersed using a nanomizer. These pulverizing and dispersing treatments were repeatedly performed and an aqueous dispersion liquid C of the silica-cationic compound agglomerated fine particle (with a solid concentration of 1%) having an average secondary particle diameter of 70 nm was prepared.

Example 15

On the support B, the following coating liquid D was applied and dried in a dry coating amount of 20 g/m$^2$ to form an ink-receiving underlayer. Then, on the ink-receiving underlayer, a 1% borax aqueous solution was uniformly applied in a dry coating amount of 0.5 g/m$^2$, and then the following coating liquid E was applied in a dry coating amount of 8 g/m$^2$ by a wet-on-wet coating method (in which two or more layers are formed by coating the upper layer on the lower layer while the lower layer is not dried), followed by drying to obtain an ink-jet recording material.

[Coating Liquid D]

To 100 parts of a gel-type silica with an average particle diameter of 0.3 μm (with a primary particle diameter of approximately 10 nm, manufactured by W. R. Grace & Co.), 20 parts of PVA with a polymerization degree of 4,000 and a saponification degree of 98% and water were added and mixed to prepare a 15% coating liquid.

[Coating Liquid E]

To 100 parts of a pseudoboehmite sol with an average particle diameter of 0.5 μm (manufactured by Catalysts & Chemicals Industries Co., Ltd., under the trade name of AS-3) (as a finely agglomerated pigment), 4 parts of the above-mentioned silica dispersion liquid c (as a coarse-grained pigment) was added and dispersed, followed by further adding and mixing 10 parts of PVA with a polymerization degree of 4,000 and a saponification degree of 98% and water to prepare a 10% coating liquid.

Example 16

An ink-jet recording material was prepared in a similar way to that of Example 15, except that the following coating liquid F was used instead of the coating liquid E.

[Coating Liquid F]

To 100 parts of a finned alumina sol with an average particle diameter of 0.2 μm (manufactured by Cabot Corporation, under the trade name of PG-003) (as a finely agglomerated pigment), 4 parts of the above-mentioned silica dispersion liquid c (as a coarse-grained pigment) was added and dispersed, followed by further adding and mixing 8 parts of PVA with a polymerization degree of 4,000 and a saponification degree of 98% and water to prepare a 10% coating liquid.

Example 17

An ink-jet recording material was prepared in a similar way to that of Example 15, except that the following coating liquid G was used instead of the coating liquid E.

[Coating Liquid G]

To 100 parts of the dispersion liquid C of the silica-cationic compound agglomerated fine particle (as a finely agglomerated pigment), 4 parts of the above-mentioned silica dispersion liquid c (as a coarse-grained pigment) was added and dispersed, followed by further adding and mixing 21 parts of PVA with a polymerization degree of 4,000 and a saponification degree of 98% and water to prepare a 10% coating liquid.

Example 18

An ink-jet recording material was prepared in a similar way to that of Example 15, except that the following coating liquid H was used instead of the coating liquid E.

[Coating Liquid H]

To 100 parts of the dispersion liquid C of the silica-cationic compound agglomerated fine particle, 4 parts of the above-mentioned silica dispersion liquid c (as a coarse-grained pigment) was added and dispersed, followed by further adding and mixing 15 parts of PVA with a polymerization degree of 4,000 and a saponification degree of 98% and water to prepare a 10% coating liquid.

Example 19

An ink jet recording material was prepared in a similar way to that of Example 18, except that the formulation amount of the silica dispersion liquid c (as a coarse-grained pigment) in the coating liquid H was changed from 4 parts to 1 part.

Example 20

An ink-jet recording material was prepared in a similar way to that of Example 18, except that the formulation amount of the silica dispersion liquid c (as a coarse-grained pigment) in the coating liquid H was changed from 4 parts to 13 parts.

Example 21

An ink-jet recording material was prepared in a similar way to that of Example 18, except that a gel-type silica with an average particle diameter of 0.03 was used instead of the gel-type silica with an average particle diameter of 0.3 μm in the coating liquid D.

Example 22

An ink-jet recording material was prepared in a similar way to that of Example 18, except that a gel-type silica with an average particle diameter of 0.8 vi was used instead of the gel-type silica with an average particle diameter of 0.3 μm in the coating liquid D.

Example 23

An ink-jet recording material was prepared in a similar way to that of Example 18, except that a paper support with a basis weight of 104.7 $g/m^2$ and an air-permeability of 2,000 seconds was used as a support.

Comparative Example 9

An ink-jet recording material was prepared in a similar way to that of Example 18, except that the silica dispersion liquid c was not formulated in the coating liquid H.

Comparative Example 10

An ink-jet recording material was prepared in a similar way to that of Example 18, except that the formulation amount of the silica dispersion liquid c (as a coarse-grained pigment) in the coating liquid H was changed from 4 parts to 16 parts.

Comparative Example 11

On the support B, a 3% borax aqueous solution was uniformly applied in a coating amount of 1.5 $g/m^2$ and then dried. Then, the coating liquid H was applied in a coating amount of 25 $g/m^2$ on the borax layer and then dried to obtain an ink-jet recording material.

Reference Example 1

An ink-jet recording material was prepared in a similar way to that of Example 15, except that a gel-type silica with an average particle diameter of 0.04 μm was used instead of the gel-type silica with an average particle diameter of 0.3 μm in the coating liquid D.

Reference Example 2

An ink-jet recording material was prepared in a similar way to that of Example 15, except that a gel-type silica with an average particle diameter of 1.2 μm was used instead of the gel-type silica with an average particle diameter of 0.3 μm in the coating liquid D.

Reference Example 3

An ink-jet recording material was prepared in a similar way to that of Example 18, except that a paper support with a basis weight of 104.7 $g/m^2$ and an air-permeability of 50 seconds was used as a support.

[Evaluation Method 3]

Each ink-jet recording material obtained in Examples 15 to 23, Comparative Examples 9 to 11, and Reference Examples 1 to 3 was evaluated by the following methods in terms of the recorded image quality, ink absorbing capability, cockling, scratch-resistance of pigment ink, difference between gloss degrees at a blank portion and at a portion printed with a pigment ink, and color-stabilizing rate thereof.

[Used Printer]

The pigment ink-jet printer and dye ink printer used in the above-mentioned evaluation method 1 were used.

(Smoothness of Blank Sheet)

The smoothness of each blank sheet was evaluated as described in the above-mentioned evaluation method 1.

(Ink Absorbing Capability)

The ink absorbing capability was evaluated as described in the above-mentioned evaluation method 1.

(Recorded Image Quality)

The recorded image quality was evaluated as described in the above-mentioned evaluation method 1.

images left still for 30 minutes and 24 hours were evaluated at the same time.

A: At least eight persons recognized that the recorded images had the same color.

B: At least eight persons recognized that the recorded images had different colors, but the difference could be ignored.

C: At least eight persons recognized that the recorded images had different colors and the difference could not be ignored.

TABLE 3

| | Smoothness of blank sheet | Ink absorbing capability | Recorded image quality | | Scratch-resistance of pigment ink | Difference between gloss degrees at a blank portion and at a portion printed with a pigment ink | Cockling | Color stabilizing rate |
|---|---|---|---|---|---|---|---|---|
| | | | Dye | Pigment | | | | |
| Example 15 | A | A | 2.01 | 1.95 | A | A | A | A |
| Example 16 | A | A | 1.93 | 1.90 | A | A | A | A |
| Example 17 | A | B | 2.10 | 2.00 | A | A | A | A |
| Example 18 | A | A | 2.11 | 2.05 | A | A | A | A |
| Example 19 | A | A | 2.15 | 2.10 | B | B | A | A |
| Example 20 | A | A | 1.90 | 1.85 | A | A | A | A |
| Example 21 | A | B | 2.15 | 2.01 | A | A | A | A |
| Example 22 | B | A | 2.08 | 2.05 | A | A | A | A |
| Example 23 | B | A | 2.02 | 1.89 | A | A | B | A |
| Comparative Example 9 | A | A | 2.15 | 2.15 | B | C | A | A |
| Comparative Example 10 | A | A | 1.78 | 1.62 | A | A | A | A |
| Comparative Example 11 | A | A | 2.10 | 2.07 | A | A | A | C |
| Reference Example 1 | A | C | 2.10 | 2.05 | A | A | A | A |
| Reference Example 2 | C | A | 2.08 | 2.03 | A | A | A | A |
| Reference Example 3 | A | A | 1.90 | 1.81 | A | A | C | A |

(Scratch-Resistance of Pigment Ink)

The scratch-resistance of pigment ink was evaluated as described in the above-mentioned evaluation method 1.

(Difference Between Gloss Degrees at a Blank Portion and at a Portion Printed with Pigment Ink)

The difference between gloss degrees at a blank portion and at a portion printed with pigment ink was evaluated as described in the above-mentioned evaluation method 1.

(Cockling)

An image of ISO-400 ("High-resolution color digital standard image data ISO/JIS-SCID", image name: fruit and basket) was printed on the approximately whole area of each recording material with a width of 610 mm using the pigment printer, and then the wavy state thereof was evaluated based on the following criteria.

A: Almost no waved portion was recognized.

B: Although waved portions were recognized, no practical problems arose.

C: Largely waved portions were recognized.

(Color-Stabilizing Rate)

An image of ISO-400 ("High-resolution color digital standard image data ISO/JIS-SCID", image name: portrait) was printed using the pigment printer, and then left still at 23° C. and at 50% humidity for 30 minutes or 24 hours. Then, the color alteration of the recorded image was visually evaluated by comparing the recorded image left still for 30 minutes with that left still for 24 hours by five adult men and five adult women. Note that printing was performed so that the recorded

Example 24

On the support B, the following coating liquid I was applied in a dry coating amount of 20 g/m$^2$, and then dried to form an ink-receiving underlayer. Then, on the ink-receiving underlayer, a 1% borax aqueous solution was uniformly applied in a dry coating amount of 0.5 g/m$^2$, and then the following coating liquid J was applied thereon in a dry coating amount of 8 g/m$^2$ in accordance with a wet-on-wet coating method (in which two or more layers are formed by coating the upper layer on the lower layer while the lower layer is not dried), followed by drying to obtain an ink-jet recording material.

[Coating Liquid I]

To 100 parts of a gel-type silica with an average particle diameter of 0.3 μm (with an average primary particle diameter of approximately 10 nm, manufactured by W. R. Grace & Co.), 0.02 parts of a blue-based colored pigment (manufactured by TOYO INK MFG. CO., LTD., under the trade name of EMT BLUE DS 18), 0.04 parts of a violet-based colored pigment (manufactured by TOYO INK MFG. CO., LTD., under the trade name of EMT VIOLET BE), 0.02 parts of a yellow-based colored pigment (manufactured by TOYO INK MFG. CO., LTD., under the trade name of EMT YELLOW 5G), 20 parts of PVA with a polymerization degree of 4,000 and a saponification degree of 98%, and water were mixed to prepare a 15% coating liquid.

[Coating Liquid J]

To 100 parts of the above-mentioned dispersion liquid C of the silica-cationic compound agglomerated fine particle, 4 parts of the above-mentioned silica dispersion liquid c (as a coarse-grained pigment) was added and dispersed, and then 15 parts of PVA with a polymerization degree of 4,000 and a saponification degree of 98% and water were added and mixed to prepare a 10% coating liquid.

[Evaluation Method 4]

The ink-jet recording material prepared in Example 24 was evaluated using a blank paper thereof, a printed paper thereof obtained using a pigment ink-jet printer (ISO-400 image, “High-resolution color digital standard image data ISO/JIS-SCID”, page 13, image name: portrait), a glossy coated paper A2 for printing (manufactured by Oji Paper Co., Ltd., under the trade name of OK TOPCOAT+, 127.9 g/m$^2$), and an offset-printed paper thereof (the same image as the above-mentioned image). Results are shown in Table 4.

(White Hue)

The white hue of each sample was compared with that of the glossy coated paper A2 and the hue tendency is shown in Table 4.

(Whiteness Degree and Sensory Chromaticity Index)

The whiteness degree of the surface of each ink-jet recording material was measured in accordance with a method defined in JIS P8148, and the sensory chromaticity index a* and the sensory chromaticity index b* were measured in accordance with a method defined in JIS P8722.

TABLE 4

| | White hue | Whiteness degree | Chromaticity index a* | Chromaticity index b* |
|---|---|---|---|---|
| Glossy coated paper A2 | — | 85.0 | 0.84 | −1.71 |
| Example 24 | Approximately same hue | 84.9 | 0.82 | −1.75 |

As is apparent from Table 3, the ink-jet recording materials of the second aspect were excellent in the smoothness, ink absorbing capability, image-quality, scratch-resistance of pigment ink, and preventability of cockling, and also exhibited a small difference between gloss degrees at a blank portion and at a portion printed with a pigment ink, and rapid color-stabilizing rate.

Moreover, as is apparent from Table 4, the ink-jet recording material of the second aspect realized the whiteness degree and color tone, equivalent to those of the coated sheet for printing, and also was excellent as an ink-jet recording material alternative to a proof-printing paper or general-printing paper.

[Silica Dispersion Liquid d]

To 1,000 g of a 1% aqueous solution of a cationic resin diallylamine-based polymer (manufactured by Nitto Boseki Co., Ltd., under the trade name of PAS-H-10L, with a molecular weight of approximately 200,000, quaternary ammonium), 110 g of a powdery silica with an average particle diameter of 6 μm (manufactured by TOKUYAMA Corp., under the trademark of FINESIL X-60) was gradually added while stirring, and then dispersing for approximately 30 minutes using a homomixer (at a rotation rate of 1,500 rpm).

[Silica Dispersion Liquid e]

A dispersion liquid was prepared in a similar way to that of the silica dispersion liquid d, except that an ammonium hydrochloride of polyvinyl amine copolymer having a polymer unit with a five-membered amidine structure (manufactured by HYMO Co., Ltd., under the trademark of HYMAX SC-700M, with a molecular weight of approximately 30,000, primary amine) was used instead of the cationic resin.

[Silica Dispersion Liquid f]

A dispersion liquid was prepared in a similar way to that of the silica dispersion liquid d, except that a powdery silica with an average particle diameter of 3 μm (manufactured by TOKUYAMA Corp., under the trademark of FINESIL X-30) was used instead of the wet process powdery silica with an average particle diameter of 6 μm.

[Slurry D of Inorganic Pigment-Cationic Resin Composite Fine Particles]

A 10% dispersion liquid of fine silica particles with an average secondary particle diameter of 80 nm was prepared by repeatedly performing a step in which a commercially available fumed silica (manufactured by TOKUYAMA Corp., under the trademark of REOLOSIL QS-30, with a specific surface area of 300 m$^2$/g, and an average primary particle diameter of approximately 9 nm) was dispersed and pulverized in water using a homomixer and a step in which the resultant was pulverized and dispersed using a nanomizer, followed by classifying the obtained dispersion liquid. II parts of an ammonium hydrochloride of polyvinyl amine copolymer having a five-membered amidine structure (manufactured by HYMO Co., Ltd., under the trademark of HYMAX SC-700, with a molecular weight of 300,000) (in solid basis) was mixed as a cationic resin with 100 parts of the dispersion liquid in silica solid basis to obtain an agglomerated dispersion liquid with an increased-viscosity. The agglomerated dispersion liquid with an increased-viscosity was further repeatedly subjected to a dispersion process using a homomixer and a pulverization and dispersion process using a nanomizer to prepare a slurry D (with a solid concentration of 11%) of composite fine particles composed of the inorganic pigment and the cationic resin, the composite fine particles having an average secondary particle diameter of 100 nm.

[Slurry E of Inorganic Pigment-Cationic Resin Composite Fine Particles]

A slurry E was prepared in a similar way to that of the aqueous slurry D of the inorganic pigment-cationic resin composite fine particles, except that an ammonium hydrochloride of polyvinyl amine copolymer having a five-membered amidine structure (manufactured by HYMO Co., Ltd., under the trademark of HYMAX SC-700M, with a molecular weight of approximately 30,000, primary amine) was used as the cationic resin.

[Slurry F of Inorganic Pigment-Cationic Resin Composite Fine Particles]

A 10% dispersion liquid of silica fine particles with an average secondary particle diameter of 80 nm was prepared by repeatedly dispersing and pulverizing in water 100 parts of a commercially available fumed silica (manufactured by TOKUYAMA Corp., under the trademark of REOLOSIL QS-30, with a specific surface area of 300 m$^2$/g and an average primary particle diameter of approximately 9 nm) and 4 parts of powdery silica with an average particle diameter of 3 μm (manufactured by TOKUYAMA Corp., under the trademark of FINESIL X-30) using a homomixer and then pulverizing and dispersing the resultant using a nanomizer, followed by classifying the obtained dispersion liquid. II parts of an ammonium hydrochloride of polyvinyl amine copolymer having a five-membered amidine structure (manufactured by HYMO Co., Ltd., under the trademark of HYMAX SC-700, with a molecular weight of 300,000) (in solid basis) was mixed as a cationic resin with 100 parts of the dispersion liquid in silica solid basis to obtain an agglomerated dispersion liquid with an increased-viscosity. The agglomerated dispersion liquid with an increased-viscosity was repeatedly dispersed and pulverized again using a homomixer and then a nanomizer to prepare a slurry F (with a solid concentration of 11%) of composite fine particles composed of the inorganic pigment and the cationic resin, the composite fine particles having an average secondary particle diameter of 100 nm.

Example 25

To 100 parts of a pseudoboehmite sol (manufactured by Catalysts & Chemicals Industries Co., Ltd., under the trade name of AS-3, with an average particle diameter of approximately 0.5 μm), 4 parts of the silica dispersion liquid d was added and dispersed, and then 12 parts of PVA with a polymerization degree of 4,000 and a saponification degree of 98% and water were added and mixed to prepare a 10% coating liquid.

On a support (manufactured by Oji Paper Co., Ltd., under the trademark of MARSHMALLOW, 104.7 g/m$^2$), a 4% borax aqueous solution was applied in a coating amount of 0.15 g/m$^2$, and then the coating liquid was applied thereon in a coating amount of 15 g/m$^2$, by a wet-on-wet coating method (in which two or more layers are formed by coating the upper layer on the tower layer while the lower layer is not dried), followed by drying to obtain an ink-jet recording material.

Example 26

An ink-jet recording material was prepared in a similar way to that of Example 25, except that a fumed alumina sol with an average particle diameter of 0.2 μm (manufactured by Cabot Corporation, under the trade name of PG-003) was used instead of the pseudoboehmite sol and the formulation amount of the PVA was changed to be 9 parts.

Example 27

An ink-jet recording material was prepared in a similar way to that of Example 25, except that the slurry D of inorganic pigment-cationic resin composite fine particles was used instead of the pseudoboehmite sol and the formulation amount of the PVA was changed to be 17 parts.

Example 28

An ink-jet recording material was prepared in a similar way to that of Example 27, except that the silica dispersion liquid e was used instead of the silica dispersion liquid d.

Example 29

An ink-jet recording material was prepared in a similar way to that of Example 27, except that the silica dispersion liquid f was used instead of the silica dispersion liquid d.

Example 30

An ink-jet recording material was prepared in a similar way to that of Example 29, except that the slurry E of inorganic pigment-cationic resin composite fine particles was used instead of the slurry D of inorganic pigment-cationic resin composite fine particles.

Example 31

40 parts of an acrylic emulsion latex was mixed with 100 parts of a gel-type silica with an average particle diameter of 0.3 μm (manufactured by W. R. Grace & Co., under the trade name of 703A) to prepare a 20% coating liquid.

On a support (manufactured by Oji Paper Co., Ltd., under the trademark of MARSHMALLOW, 104.7 g/m$^2$), the dispersion liquid was applied and dried in a coating amount of 10 g/m$^2$ to form a first coating layer. On the first coating layer, a 4% borax aqueous solution was applied in a coating amount of 0.15 g/m$^2$, and then the coating liquid described in Example 30 was applied thereon in a coating amount of 10 g/m$^2$, by a wet-on-wet coating method, followed by drying to obtain an ink-jet recording material.

Example 32

An ink-jet recording material was prepared in a similar way to that of Example 31, except that a mixture composed of 50 parts of the gel-type silica with an average particle diameter of 0.3 μm and 50 parts of a kaolin (manufactured by ENGELHARD CORPORATION, under the trademark of ULTRA WHITE 90, with an average particle diameter of 0.5 μm, an oil absorption of 46 ml/100 g, and a specific surface area of 14 m$^2$/g) was used instead of 100 parts of the gel-type silica with an average particle diameter of 0.3 μm in the first coating layer.

Example 33

An ink-jet recording material was prepared in a similar way to that of Example 32, except that 0.02 parts of a blue-based colored pigment (manufactured by TOYO INK MFG. CO., LTD., under the trade name of EMT BLUE DS 18), 0.04 parts of a violet-based colored pigment (manufactured by TOYO INK MFG. CO., LTD., under the trade name of EMT VIOLET BE), and 0.02 parts of an yellow-based colored pigment (manufactured by TOYO INK MFG. CO., LTD., under the trade name of EMT YELLOW 56) were formulated with respect to 100 parts of the pigment in the first coating layer.

Comparative Example 12

An ink-jet recording material was prepared in a similar way to that of Example 25, except that the silica dispersion liquid d was not formulated.

Comparative Example 13

An ink-jet recording material was prepared in a similar way to that of Example 26, except that the silica dispersion liquid d was not formulated.

Comparative Example 14

An ink-jet recording material was prepared in a similar way to that of Example 27, except that the silica dispersion liquid d was not formulated.

Comparative Example 15

An ink-jet recording material was prepared in a similar way to that of Comparative Example 14, except that the slurry F of the inorganic pigment-cationic resin composite fine particles was used instead of the slurry D of the inorganic pigment-cationic resin composite fine particles.

Comparative Example 16

To 100 parts of a pseudoboehmite sol (manufactured by Catalysts & Chemicals Industries Co., Ltd., under the trade name of AS-3, with an average particle diameter of approximately 0.5 μm), 4 parts of a powdery silica (manufactured by TOKUYAMA Corp., under the trademark of FINESIL X-30) was added and dispersed (using a homomixer at 1,500 rpm for 30 minutes), and then 12 parts of PVA with a polymerization degree of 4,000 and a saponification degree of 98% was added and mixed to prepare a 10% coating liquid.

On a support (manufactured by Oji Paper Co., Ltd., under the trademark of MARSHMALLOW, 104.7 g/m$^2$), a 4% borax aqueous solution was applied in a coating amount of 0.15 g/m$^2$, and then the coating liquid was applied thereon in a coating amount of 15 g/m$^2$, by a wet-on-wet coating method (in which two or more layers are formed by coating the upper layer on the lower layer while the lower layer is not dried), followed by drying to prepare an ink-jet recording material.

Comparative Example 17

To 100 parts of a fumed alumina sol with a particle diameter of 0.2 μm (manufactured by Cabot Corporation, under the trade name of PG-003), 4 parts of a powdery silica (manufactured by TOKUYAMA Corp., under the trademark of FINESIL X-30) was added and dispersed (using a homomixer at 1,500 rpm for 30 minutes), and then 12 parts of PVA with a polymerization degree of 4,000 and a saponification degree of 98% and water were added and mixed to prepare a 10% coating liquid.

On a support (manufactured by Oji Paper Co., Ltd., under the trademark of MARSHMALLOW, 104.7 g/m$^2$), a 4% borax aqueous solution was applied in a coating amount of 0.15 g/m$^2$, and then the coating liquid was applied thereon in a coating amount of 15 g/m$^2$, by a wet-on-wet coating method (in which two or more layers are formed by coating the upper layer on the lower layer while the lower layer is not dried), followed by drying to obtain an ink-jet recording material.

Comparative Example 18

To 100 parts of the slurry D of the inorganic pigment-cationic resin composite fine particles, 4 parts of a wet process powdery silica (manufactured by TOKUYAMA Corp., under the trademark of FINESIL X-30) was added and dispersed (using a homomixer at 1,500 rpm for 30 minutes), and then 12 parts of PVA with a polymerization degree of 4,000 and a saponification degree of 98% and water was added and mixed to prepare a 10% coating liquid.

On a support (manufactured by Oji Paper Co., Ltd., under the trademark of MARSHMALLOW, 104.7 g/m$^2$), a 4% borax aqueous solution was applied in a coating amount of 0.15 g/m$^2$, and then the coating liquid was applied thereon in a coating amount of 15 g/m$^2$, by a wet-on-wet coating method (in which two or more layers are formed by coating the upper layer on the lower layer while the lower layer is not dried), followed by drying to obtain an ink-jet recording material.

Comparative Example 19

To 850 g of a 3% aqueous solution of a cationic resin diallylamine-based polymer (manufactured by Nitto Boseki Co., Ltd., under the trade name of PAS-H-10L, with a molecular weight of approximately 200,000, quaternary ammonium), 150 g of a wet process silica with an average particle diameter of 3 μm (manufactured by TOKUYAMA Corp., under the trademark of FINESIL X-30) was added and dispersed, and then 30 parts of PVA with a polymerization degree of 1,800 and a saponification degree of 98% and water were added and mixed to prepare a 14% coating liquid.

On a support (manufactured by Oji Paper Co., Ltd., under the trademark of MARSHMALLOW, 104.7 g/m$^2$), the coating liquid was applied in a coating amount of 14 g/m$^2$, and then dried to obtain an ink-jet recording material.

[Evaluation Method 5]

Each ink-jet recording material obtained in Examples 25 to 33 and Comparative Examples 12 to 19 was evaluated by the following methods in terms of the surface smoothness, ink absorbing capability, recorded image quality realized when dye and pigment inks are used, scratch-resistance of pigment ink, and difference between gloss degrees at a blank portion and at a portion printed with a pigment ink, and results thereof are shown in Table 5.

[Used Printer]

Dye ink-Jet printer: one manufactured by SEIKO EPSON CORPORATION, under the model name of PM-G820, and printing was performed in a photo paper fine mode.

Pigment ink-jet printer: the same one as that used in the above-mentioned evaluation methods 1 and 3.

(Smoothness of Blank Sheet)

The smoothness was evaluated in the same way as that of the evaluation methods 1 and 3.

(Ink Absorbing Capability)

The ink absorbing capability was evaluated in the same way as that of the evaluation methods 1 and 3.

(Recorded Image Quality)

The recorded image quality was evaluated in the same way as that of the evaluation methods 1 and 3.

(Scratch-Resistance of Pigment Ink)

The scratch-resistance of pigment ink was evaluated in the same way as that of the evaluation methods 1 and 3.

(Difference Between Gloss Degrees at a Blank Portion and at a Portion Printed with a Pigment Ink)

The difference was evaluated in the same way as that of the evaluation methods 1 and 3.

[Evaluation Method 6]

The ink-jet recording material obtained in Example 33 was evaluated in the same way as that of the above-mentioned evaluation method 1, in terms of the white hue, whiteness degree, and sensory chromaticity index. Results thereof are shown in Table 6.

TABLE 5

| | Smoothness of blank sheet | Ink absorbing capability | Recorded image quality | | Scratch-resistance of pigment ink | Difference between gloss degrees at a blank portion and at a portion printed with a pigment ink |
|---|---|---|---|---|---|---|
| | | | Dye | Pigment | | |
| Example 25 | A | A | 2.01 | 1.85 | A | A |
| Example 26 | A | A | 1.93 | 1.83 | A | A |
| Example 27 | B | A | 2.00 | 1.80 | A | A |
| Example 28 | A | A | 2.01 | 1.85 | A | A |
| Example 29 | A | A | 2.05 | 1.92 | A | A |
| Example 30 | A | A | 2.11 | 2.02 | A | A |
| Example 31 | A | A | 2.18 | 2.10 | A | A |
| Example 32 | A | A | 2.13 | 2.04 | A | A |
| Example 33 | A | A | 2.12 | 2.04 | A | A |
| Comparative Example 12 | A | B | 2.05 | 1.89 | B | C |
| Comparative Example 13 | A | B | 1.96 | 1.87 | B | C |
| Comparative Example 14 | A | B | 2.06 | 1.87 | B | C |
| Comparative Example 15 | A | B | 2.10 | 2.05 | B | C |

TABLE 5-continued

| | Smoothness of blank sheet | Ink absorbing capability | Recorded image quality | | Scratch-resistance of pigment ink | Difference between gloss degrees at a blank portion and at a portion printed with a pigment ink |
|---|---|---|---|---|---|---|
| | | | Dye | Pigment | | |
| Comparative Example 16 | C | A | 1.98 | 1.80 | A | B |
| Comparative Example 17 | C | A | 1.87 | 1.81 | A | B |
| Comparative Example 18 | C | A | 1.97 | 1.80 | A | B |
| Comparative Example 19 | B | A | 1.60 | 1.51 | A | A |

TABLE 6

| | White hue | Preservability of white paper | Whiteness degree | Chromaticity index a* | Chromaticity index b* |
|---|---|---|---|---|---|
| Glossy coated paper A2 | — | Approximately unchanged | 85.0 | 0.84 | −1.71 |
| Example 33 | Approximately same hue | Approximately unchanged | 85.7 | 0.81 | −1.72 |

As is apparent from Table 5, the ink-jet recording materials obtained by applying the coating liquid prepared by a production method of the third aspect of the present invention were excellent in the surface smoothness of a blank sheet, ink absorbing capability, recorded image quality realized when dye and pigment inks are used, and scratch-resistance of pigment ink, and also exhibited a small difference between gloss degrees at a blank portion and at a portion printed with a pigment ink.

Moreover, as is apparent from Table 6, the ink-jet recording material obtained by the production method of the third aspect of the present invention exhibited good appearance and exhibited the whiteness degree and color tone equivalent to those of the coated sheet for printing due to the formulated colored pigment, and therefore was excellent as an ink-jet recording sheet alternative to proof-printing paper or general-printing paper.

[Silica Fine Particle G]

A filmed silica with an average particle diameter of 1.0 μm (manufactured by NIPPON AEROSIL CO., LTD., under the trademark of AEROSIL A300, with an average primary particle diameter of approximately 0.008 μm) was dispersed using a sand mill, and then further dispersed using a pressure-type homogenizer. The dispersion procedures were repeatedly performed using the sand mill and the pressure-type homogenizer until the average particle diameter was 0.08 μm to prepare a 10% aqueous dispersion. To the 10% aqueous dispersion, 10 parts of a cationic compound with a five-membered amidine structure (manufactured by HYMO Co., Ltd., under the trade name of SC-700, with a molecular weight of 300,000) was added and dispersed using the sand mill, and then further dispersed using the pressure-type homogenizer. The dispersion procedures were repeatedly performed using the sand mill and the pressure-type homogenizer until the average particle diameter was 0.15 μm to prepare a 10% aqueous dispersion.

Example 34

[Coating Liquid K]

50 parts of a gel-type silica (manufactured by Grace Davison, under the trademark of SYLOID 74X6500, with an average particle diameter of 5.4 μm, and a specific surface area of 260 $m^2/g$), 50 parts of calcium carbonate (manufactured by SHIRAISHI KOGYO KAISHA, LTD., under the trademark of CALLITE KT, with an average particle diameter of 2.6 μm, an oil absorption of 33 ml/100 g, and a specific surface area of 33 $m^2/g$), 30 parts of an acrylic polymer (manufactured by Rohm and Haas Company, under the trademark of PRIMAL P-376, an emulsion-type adhesive) as a binder, and 0.2 parts of a dispersant (manufactured by TOAGOSEI CO., LTD., under the trademark of ARON SD-10) were mixed to prepare an aqueous dispersion (with a concentration of 30%).

[Coating Liquid L]

17 parts of PVA (manufactured by KURARAY CO., LTD., under the trade name of PVA-135, with a polymerization degree of 3,500 and a saponification degree of 98.5%) were mixed as a binder with 100 parts of the silica fine particle G to prepare an 8% aqueous solution.

[Support C]

A support C was obtained in a similar way to that of the support A, except that the basis weight thereof was changed to be 180 $\mu m^2$.

[Preparation Of Ink-Jet Recording Material]

On the support C, the coating liquid K was applied in a coating amount of 15 $g/m^2$, and then dried to form an ink-receiving underlayer. On the ink-receiving underlayer, a 4% borax aqueous solution was applied in a coating amount of 0.15 $g/m^2$, and then the coating liquid L was applied thereon in a coating amount of 10 $g/m^2$, by a wet-on-wet coating method (in which two or more layers are formed by coating the upper layer on the lower layer while the lower layer is not dried), followed by drying to form an ink-receiving top layer. Thus, an ink-jet recording material was obtained.

Example 35

[Silica Fine Particle H]

A gel-type silica (manufactured by Grace Davison, under the trademark of SYLOID 74×6500) was dispersed using a sand mill and then further dispersed using a pressure-type homogenizer. The dispersion procedures were repeatedly performed using the sand mill and the pressure-type homogenizer until the average particle diameter was 0.4 μm. Thus, a 10% aqueous dispersion was prepared.

[Coating Liquid M]

50 parts of calcium carbonate (manufactured by KOMESHO SEKKAIKOGYO CO., LTD., under the trade name of PP-2, with an average particle diameter of 0.2 μm, an oil absorption of 47 ml/100 g, and a specific surface area of 8 $m^2/g$), 50 parts of the silica fine particle H, 30 parts of an acrylic polymer (manufactured by Rohm and Haas Company, under the trademark of PRIMAL P-376, an emulsion-type adhesive) as a binder, and 0.2 parts of a dispersant (manufactured by TOAGOSEI CO., LTD., under the trademark of ARON SD-10) were mixed to obtain an aqueous dispersion (with a concentration of 30%).

[Preparation of Ink-Jet Recording Material]

An ink-jet recording material was prepared in a similar way to that of Example 34, except that the coating liquid M was used instead of the coating liquid K to form an ink-receiving underlayer.

Example 36

[Coating Liquid N]

50 parts of titanium dioxide (manufactured by SAKAI CHEMICAL INDUSTRY CO., LTD., under the trade name of STR-60, with an average particle diameter of 0.03 μm, and a specific surface area of 65 $m^2/g$), 50 parts of the silica fine particle H, 30 parts of PVA (manufactured by KURARAY CO., LTD., under the trade name of PVA-235, with a polymerization degree of 3,500, and a saponification degree of 88.5%) as a binder, and 0.2 parts of a dispersant (manufactured by TOAGOSEI CO., LTD., under the trademark of ARON SD-10) were mixed to prepare an aqueous dispersion (with a concentration of 30%).

[Preparation of Ink-Jet Recording Material]

An ink-Jet recording material was prepared in a similar way to that of Example 34, except that the coating liquid N was used instead of the coating liquid K to form an ink-receiving underlayer.

Example 37

An ink-jet recording material was prepared in a similar way to that of Example 35, except that a kaolin (manufactured by ENGELHARD CORPORATION, under the trademark of ULTRA WHITE 90, with an average particle diameter of 0.5 μm, an oil absorption of 46 ml/100 g, and a specific surface area of 14 $m^2/g$) was used instead of calcium carbonate in the coating liquid M to form an ink-receiving underlayer.

Example 38

[Coating Liquid O]

50 parts of a kaolin (manufactured by ENGELHARD CORPORATION, under the trademark of ULTRA WHITE 90), 50 parts of the silica fine particle H, 30 parts of a SBR-based polymer (manufactured by JSR Corporation under the trade name of OJ1000, an emulsion-type adhesive) as a binder, 10 parts of borax as a gelatinizing agent, and 0.2 parts of a dispersant (manufactured by TOAGOSEI CO., LTD., under the trademark of ARON SD-110) were mixed to obtain an aqueous dispersion (with a concentration of 30%).

[Preparation of Ink-Jet Recording Material]

On the support C, the coating liquid O was applied in a coating amount of 15 $g/m^2$, and then dried to form an ink-receiving underlayer. The ink-receiving underlayer was further subjected to a smoothing treatment by applying a pressure at 1100 kg/cm using a calendar. On the ink-receiving underlayer, the coating liquid L was applied in a coating amount of 10 $g/m^2$, and then dried to form an ink-receiving top layer. Thus, an ink-jet recording material was obtained.

Example 39

[Coating Liquid P]

50 parts of a kaolin (manufactured by ENGELHARD CORPORATION, under the trademark of ULTRA WHITE 90), 50 parts of the silica fine particle H, 30 parts of a SBR-based polymer (manufactured by JSR Corporation, under the trade name of OJ11000, an emulsion-type adhesive) as a binder, and 0.2 parts of a dispersant (manufactured by TOAGOSEI CO., LTD., under the trademark of ARON SD-10) were mixed to obtain an aqueous dispersion (with a concentration of 30%).

[Support D]

The polyolefin resin composition 1 used in the support B was applied in a coating amount of 28 $g/m^2$ on the felt side of the support C, and also applied on the wire side of the size-press base paper in a coating amount of 18 $g/m^2$, using a melt extruder equipped with a T-die (of which the melting temperature was 320° C.). The felt side of the base paper was cooled to be solidified with the mirrored-surface of a roll and the wire side of the base paper was cooled to be solidified with a roughened surface of a cooling roll, to obtain a support D with a smoothness (Ohken-type, J. TAPPI No. 5) of 6,000 seconds and an opacity (JIS P 8138) of 93%.

[Preparation of Ink-Jet Recording Material]

On the support D, the coating liquid P was applied in a coating amount of 15 $g/m^2$, and then dried to form an ink-receiving underlayer. The ink-receiving underlayer was further subjected to a smoothing treatment by applying a pressure at 100 kg/cm using a calendar. On the ink-receiving underlayer, a 4% borax aqueous solution was applied in a coating amount of 0.15 $g/m^2$, and then the coating liquid L was applied thereon in a coating amount of 10 $g/m^2$, by a wet-on-wet coating method, followed by drying to form an ink-receiving top layer. Thus, an ink-jet recording material was prepared.

Example 40

[Coating Liquid Q]

100 parts of colloidal silica fine particles cationized with alumina (manufactured by NISSAN CHEMICAL INDUSTRIES, LTD., under the trade name of ST-AKL, with an average primary particle diameter of 50 nm), 5 parts of an emulsion-type acrylic resin latex (with an average particle diameter of 60 nm, and Tg of 100° C.) as a binder, and 5 parts of a release agent (ammonium oleate) were mixed in water to prepare a 10% aqueous dispersion.

[Preparation of Ink-Jet Recording Material]

An ink-jet recording material with a high-gloss was prepared by applying the coating liquid Q in a coating amount of 1 $g/m^2$ on the ink-receiving top layer of the ink-jet recording material prepared in Example 38 to form a third coating layer, and then bringing the third coating layer in a wet state into press contact with a mirror drum with a surface temperature of 95° C. to dry.

Example 41

[Coating Liquid R]

50 parts of a kaolin (manufactured by ENGELHARD CORPORATION, under the trademark of ULTRA WHITE 90), 50 parts of the silica fine particle H, 30 parts of a SBR-based polymer (manufactured by JSR CORPORATION, under the trade name of OJI 000, an emulsion-type adhesive) as a binder, 0.2 parts of a dispersant (manufactured by TOAGOSEI CO., LTD., under the trademark of ARON SD-10), 0.020 parts of a blue coloring agent (manufactured by Dainichiseika Color & Chemicals Mfg. Co., Ltd., under the trade name of DC-Blue XB), 0.053 parts of a violet coloring agent (manufactured by Dainichiseika Color & Chemicals Mfg. Co., Ltd., under the trade name of DC-Violet XR-N), and 0.070 parts of an yellow coloring agent (manufactured by Dainichiseika Color & Chemicals Mfg. Co., Ltd., under the trade name of TB-500 Yellow) were mixed to obtain an aqueous dispersion (with a concentration of 30%).

[Coating Liquid S]

0.2 parts of a cationic compound with a five-membered amidine structure (manufactured by HYMO Co., Ltd., under the trade name of SC-700, with a molecular weight of 300, 000), 1 part of a precipitated silica (manufactured by TOKUYAMA Corp., under the trademark of FINESIL X-45, with a particle diameter of 4.5 μm, and a specific surface area of 300 $m^2/g$) as a coarse-grained pigment, and 17 parts of PVA (manufactured by KURARAY CO., LTD., under the trade name of PVA-135, with a polymerization degree of 3,500 and a saponification degree of 98.5%) as a binder were mixed with 100 parts of the silica fine particle G to prepare an 8% aqueous solution.

[Preparation of Ink-Jet Recording Material]

On the support C, the coating liquid P was applied in a coating amount of 15 $g/m^2$, and then dried to form an ink-receiving underlayer. The ink-receiving underlayer was further subjected to a smoothing treatment by applying a pressure at 100 kg/cm using a calendar. On the ink-receiving underlayer, a 4% borax aqueous solution was applied in a coating amount of 0.15 $g/m^2$, and then the coating liquid L was applied thereon in a coating amount of 10 $g/m^2$, by a wet-on-wet coating method, followed by drying to form an ink-receiving top layer. The ink-receiving top layer was further subjected to a smoothing treatment by applying a pressure at 100 kg/cm using a calendar to obtain an ink-jet recording material.

Example 42

An ink-Jet recording material was prepared in a similar way to that of Example 41, except that the support D was used instead of the support C.

Example 43

An ink-et recording material was prepared in a similar way to that of Example 41, except that a commercially available coated paper (manufactured by Oji Paper Co., Ltd., under the trade name of OK TOPCOAT+, 104.7 $g/m^2$) was used instead of the support C.

Comparative Example 20

[Coating liquid T]

100 parts of a gel-type silica (manufactured by Grace Davison, under the trademark of SYLOID 74X6500, with an average particle diameter of 5.4 μm and a specific surface area of 260 $m^2/g$), 30 parts of PVA (manufactured by KURARAY CO., LTD., under the trade name of PVA-235) as a binder, and 0.2 parts of a dispersant (manufactured by TOAGOSEI CO., LTD. under the trademark of ARON SD-10) were mixed to prepare an aqueous dispersion (with a concentration of 30%).

[Preparation of Ink-Jet Recording Material]

An ink-jet recording material was prepared in a similar way to that of Example 34, except that the coating liquid T was used instead of the coating liquid K to form an ink-receiving underlayer.

Comparative Example 21

[Coating liquid U]

100 parts of a kaolin (manufactured by ENGELHARD CORPORATION, under the trademark of ULTRA WHITE 90), 30 parts of a SBR-based polymer (manufactured by JSR Corporation, under the trade name of OJ1000, an emulsion-type adhesive) as a binder, and 0.2 parts of a dispersant (manufactured by TOAGOSEI CO., LTD. under the trademark of ARON SD-10) were mixed to prepare an aqueous dispersion (with a concentration of 30%).

[Preparation Of Ink-Jet Recording Material]

An ink-jet recording material was prepared in a similar way to that of Example 34, except that the coating liquid U was used instead of the coating liquid K to form an ink-receiving underlayer.

Comparative Example 22

An ink-jet recording material was prepared in a similar way to that of Comparative Example 21, except that the support D was used instead of the support C.

[Evaluation Method 7]

Each ink-jet recording material obtained in Examples 34 to 40 and Comparative Examples 20 to 22 was evaluated by the following methods in terms of the smoothness, ink absorbing capability, recorded image quality, and cockling of the printed recording material.

The commercially available dye ink-jet printer (the same one as that used in the evaluation method 5) and a pigment ink-jet printer (manufactured by SEIKO EPSON CORPORATION, under the model name of PX-G920) were used to evaluate the ink absorbing capability, recorded image quality, cockling of the printed recording material. Results thereof are shown in Table 7.

(Smoothness of Blank Sheet)

Each ink-jet recording material was visually and texturally evaluated in the following three stages.

A: High-smoothness approximately equal to that of a silver halide photography was realized.

B: Smoothness approximately equal to that of a paper for printing was realized.

C: Smoothness inferior to that of a paper for printing at a level where no particular practical problems arose was realized.

(Ink Absorbing Capability)

The ink absorbing capability was evaluated in a similar way to that of the evaluation method 1.

(Recorded Image Quality)

Each colored ink was solidly printed, or overlappingly and solidly printed, and the obtained color-density was measured using a Macbeth reflection densitometer (Macbeth RD-920) and the fineness of the image-quality was visually evaluated in the following three stages.

A: Color-density of each color was high and the color reproduction area of recorded image was sufficiently broad.

B: The color reproduction area of recorded image slightly deteriorated, but no particular practical problems arose.

C: The color reproduction area of recorded image deteriorated.

(Cockling of Printed Recording Material)

Each ink-jet recording material was visually and texturally evaluated in the following four stages.

A: No wave-shaped bends were recognized at printed portions at the same level as a silver halide photography.

B: Wave-shaped bends were slightly recognized at printed portions at the same level as a printing paper.

C: Wave-shaped bends were more recognized than a printing paper, but no particular practical problems arose.

D: Wave-shaped bends were significantly recognized.

Evaluation Method 8

Each ink-jet recording material obtained in Examples 41 to 43 and Comparative Example 20 was evaluated by the following methods in terms of cockling, appearance, and recorded image quality. In order to evaluate the ink-jet recording material, a commercially available pigment ink-jet printer for a wide format (manufactured by SEIKO EPSON CORPORATION, under the model name of PX-9000) was used and a glossy coated paper A2 for printing (manufactured by Oji Paper Co., Ltd., under the trade name of OK TOPCOAT+, 127.9 g/$m^2$) and an offset printed matter thereof were used as comparison objects. Results thereof are shown in Table 8.

(Cockling of Printed Recording Material)

The cockling was evaluated in the same way as that of the evaluation method 7.

(Appearance)

On each ink-jet recording material, an image of ISO-400 ("High-resolution color digital standard image data ISO/JIS-SCID", page 13, image name: fruit basket) was printed and the texture of the printed matter was comprehensively evaluated.

A: Texture equivalent to that of an offset printed matter was realized and there was no sensory distinction.

B: Although texture equivalent to that of an offset printed matter was realized, there was a sensory distinction.

C: Texture significantly distinguished from that of an offset printed matter was realized.

(Whiteness Degree and Sensory Chromaticity Index)

The whiteness degree of each ink-jet recording material was measured in accordance with a method defined in JIS P8148 and the sensory chromaticity index a* and the sensory chromaticity index b* were measured in accordance with a method defined in JIS P8722.

TABLE 7

| | Smoothness | Ink absorbing capability | Image quality | Cockling |
|---|---|---|---|---|
| Example 34 | B to C | A | A to B | C |
| Example 35 | B | A to B | A to B | B |
| Example 36 | B | A | A to B | B |
| Example 37 | B | A | A | B |
| Example 38 | B to A | A | A | B |
| Example 39 | B to A | A | A | A |
| Example 40 | A | A | A | B |
| Comparative Example 20 | C | A | A | D |
| Comparative Example 21 | B | C | B | B |
| Comparative Example 22 | B | C | B | A |

TABLE 8

| | Cockling | Appearance | Whiteness degree | Chromaticity index a* | Chromaticity index b* |
|---|---|---|---|---|---|
| Example 41 | B | B | 85 | 0.7 | −1.4 |
| Example 42 | A | B to C | 85 | 0.7 | −1.4 |
| Example 43 | B | B | 85 | 0.7 | −1.4 |
| Comparative Example 20 | D | D | 92 | −1.1 | 1.1 |
| Coated sheet for printing | B | — | 85 | 0.7 | −1.4 |

As is apparent from Table 7, the ink-jet recording materials according to the present invention exhibited an excellent smoothness and uniformity at the image-recording part, ink absorbing capability, and preventability of cockling (Examples 34 to 40).

On the other hand, in the case where the pigment component of the ink-receiving underlayer provided near the support was composed of only the pigment with a BET specific surface area of no less than 100 $m^2$/g, the preventability of cockling was deteriorated (Comparative Example 20). In the case where the pigment component of the receiving underlayer provided near the support was composed of only the pigment with a BET specific surface area of less than 100 $m^2$/g, the ink absorbing capability was deteriorated (Comparative Examples 21 and 22).

Moreover, as is apparent from Table 8, the ink-jet recording materials according to the present invention realized excellent preventability of cockling, and excellent appearance, and also, exhibited the whiteness degree and color tone equivalent to those of a coated sheet for printing due to the formulated colored pigment, and thus was available as an excellent proof-printing paper (Examples 41, 42, and 43).

Industrial Applicability

The present invention provides an ink-jet recording material which has a favorable ink absorbing capability sufficient to perform rapid recording, is excellent in smoothness at an image-recording part, exhibits a high image-density and an extremely favorable image-uniformity, and is suitable for a dye ink and pigment ink.

The invention claimed is:

1. An ink-jet recording material comprising: a support; and at least two ink-receiving layers of an ink-receiving underlayer and an ink-receiving top layer, the ink-receiving layers being disposed on the support and each comprising a pigment and a binder, wherein the ink-receiving underlayer comprises at least a pigment A selected from the group consisting of a calcium carbonate, a kaolin and a titanium dioxide, and a pigment B comprising a wet process silica, the pigment A having a BET specific surface area of less than 100 $m^2$/g, the pigment B having a BET specific surface area of no less than 100 $m^2$/g, and a content ratio of the pigment A to the pigment B being within a range of 9/1 to 1/9, wherein the main component of the binder contained in the ink-receiving under layer is selected from emulsion latexes; and wherein the ink-receiving top layer comprises a finely agglomerated pigment with an average particle diameter of 0.008 to 0.7 μm and a binder, wherein the finely agglomerated pigment comprises a fumed silica, wherein the main component of the binder contained in the ink-receiving top layer is a polyvinyl alcohol (PVA) and the ink-receiving top layer contains a compound that is cross-linkable with PVA.

2. The ink-jet recording material according to claim 1, wherein the pigment A has an oil absorption of 10 to 100 ml/100g.

3. The ink-jet recording material according to claim 1, wherein the pigment B has an average particle diameter of 0.01 to 0.7 μm.

4. The ink-jet recording material according to claim 1, wherein said ink-jet recording material is prepared by a casting method in which the ink-receiving top layer in a wet state or a cast-coating liquid applied on the ink-receiving top layer in a wet state is brought into press contact with a heated mirror drum and then dried to copy a mirror surface thereon.

* * * * *

UNITED STATES PATENT AND TRADEMARK OFFICE

CERTIFICATE OF CORRECTION

PATENT NO. : 8,202,586 B2
APPLICATION NO. : 11/815000
DATED : June 19, 2012
INVENTOR(S) : Tomomi Takahashi et al.

It is certified that error appears in the above-identified patent and that said Letters Patent is hereby corrected as shown below:

In Column 1, (Item 56) Column 2, Line 29, Under Other Publications, change "Aasakurashoten," to --AsakuraShoten,--.

In Column 1, Line 13, Change "No.2005-151790," to --No. 2005-151790,--.

In Column 4, Line 44, Change "inkjet" to --ink-jet--.

In Column 9, Line 34, Change "roiling" to --rolling--.

In Column 9, Line 45, Change "impovedly" to --improvedly--.

In Column 10, Line 18, Change "polymers," to --polymers;--.

In Column 10, Line 52, Change "filmed" to --fumed--.

In Column 12, Line 3, Change "coaing" to --coating--.

In Column 14, Line 64, Change "(Calendar" to --(Calender--.

In Column 15, Line 2, Change "calendar." to --calender.--.

In Column 15, Line 2, Change "calendaring" to --calendering--.

In Column 15, Line 4, Change "calendaring" to --calendering--.

In Column 15, Line 5, Change "calendaring" to --calendering--.

In Column 15, Lines 20-21, Change "homonmixer" to --homomixer--.

In Column 19, Line 3, Change "layer" to --layer.--.

In Column 20, Line 62, Change "1100" to --100--.

In Column 22, Line 23, Change "ink-Jet" to --ink-jet--.

In Column 23, Line 3, Change "ink-Jet" to --ink-jet--.

In Column 28, Line 22, Change "calendar" to --calender--.

In Column 28, Line 41, Change "finned" to --fumed--.

In Column 28, Line 44, Change "µM)" to --µm)--.

In Column 29, Lines 27-28, Change "calendar" to --calender--.

Signed and Sealed this
Nineteenth Day of March, 2013

Teresa Stanek Rea
*Acting Director of the United States Patent and Trademark Office*

In Column 30, Line 12, Change "PO-003)" to --PG-003)--.

In Column 31, Line 22, Change "50)" to --5G)--.

In Column 33, Line 43, Change "thereof" to --thereof,--.

In column 34, Line 64, after the word gloss, start a new para. on line 65 with "Moreover, it ......

In Column 35, Line 10, Change "canonized" to --cationized--.

In Column 35, Line 17, Change "calendar" to --calender--.

In Column 35, Line 18, Change "ID" to --1.0--.

In Column 36, Line 20, Change "Co," to --Co.,--.

In Column 36, Line 30, Change "1%)" to --11%)--.

In Column 37, Line 2, Change "finned" to --fumed--.

In Column 37, Line 44, Change "ink jet" to --ink-jet--.

In Column 37, Line 60, Change "0.03" to --0.03 μm--.

In Column 38, Line 1, Change "vi" to --μm--.

In Column 42, Line 22, Change "II" to --11--.

In Column 42, Line 61, Change "II" to --11--.

In Column 43, Line 25, Change "tower" to --lower--.

In Column 44, Line 36, Change "56)" to --5G)--.

In Column 46, Line 15, Change "ink-Jet" to --ink-jet--.

In Column 47, Line 50, Change "filmed" to --fumed--.

In Column 48, Line 27, Change "180 $\mu m^2$." to --180 $g/m^2$.--.

In Column 49, Line 16, Change "ink-Jet" to --ink-jet--.

In Column 49, Line 41, Change "SD-110)" to --SD-10)--.

In Column 49, Line 48, Change "1100" to --100--.

In Column 49, Line 48, Change "calendar." to --calender.--.

In Column 49, Line 60, Change "OJ11000," to --OJ1000,--.

In Column 50, Line 15, Change "calendar." to --calender.--.

In Column 50, Line 50, Change "OJI 000," to --OJ1000,--.

In Column 51, Line 13, Change "calendar." to --calender.--.

In Column 51, Line 20, Change "calendar" to --calender--.

In Column 51, Line 25, Change "ink-Jet" to --ink-jet--.

In Column 51, Line 32, Change "ink-et" to --ink-jet--.

In Column 51, Line 48, Change "LTD." to --LTD.,--.

In Column 51, Line 65, Change "LTD." to --LTD.,--.